(12) United States Patent
Kanasaki

(10) Patent No.: US 11,412,030 B2
(45) Date of Patent: Aug. 9, 2022

(54) SERVICE PROVIDING SYSTEM FOR SCANNING OVER A NETWORK

(71) Applicant: Ricoh Company, Ltd., Tokyo (JP)

(72) Inventor: Katsumi Kanasaki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 12 days.

(21) Appl. No.: 16/362,943

(22) Filed: Mar. 25, 2019

(65) Prior Publication Data

US 2019/0222637 A1 Jul. 18, 2019

Related U.S. Application Data

(60) Division of application No. 14/626,553, filed on Feb. 19, 2015, now Pat. No. 10,284,629, which is a
(Continued)

(30) Foreign Application Priority Data

Jan. 27, 2004 (JP) .................................. 2004-018813
Jan. 6, 2005 (JP) .................................. 2005-001573

(51) Int. Cl.
*H04L 29/08* (2006.01)
*H04L 67/10* (2022.01)
(Continued)

(52) U.S. Cl.
CPC ............ *H04L 67/10* (2013.01); *G06F 16/958* (2019.01); *H04L 67/02* (2013.01); *H04L 67/16* (2013.01);
(Continued)

(58) Field of Classification Search
CPC ......... H04L 67/10; H04L 67/16; H04L 67/02; G06F 16/958; H04N 1/00464;
(Continued)

(56) References Cited

U.S. PATENT DOCUMENTS 5,848,413 A * 12/1998 Wolff ...................... H04L 29/06
6,012,083 A * 1/2000 Savitzky ............... G06F 40/221
709/202
(Continued)

FOREIGN PATENT DOCUMENTS

JP 09-238215 9/1997
JP 2002-84383 3/2002
(Continued)

OTHER PUBLICATIONS

Zhang et al., "A SOAP-Oriented Component-Based Framework Supporting Device-Independent Multimedia Web Services," Fourth International Symposium on Multimedia Software Engineering, 2002, pp. 40-47, ISBN: 0-7695-1857-5.

*Primary Examiner* — Tejal Gami
(74) *Attorney, Agent, or Firm* — Xsensus LLP

(57) ABSTRACT

A service provider apparatus is provided with a first application for executing a process related to a Web page or Web contents, and a service providing part for providing services. The first application sends a request to a second application included in another apparatus. The service providing part receives a service providing request related to the request from the second application, and provides a service depending on the service providing request, so as to expand functions of the services provided by the service provider apparatus.

21 Claims, 25 Drawing Sheets

Related U.S. Application Data division of application No. 12/823,928, filed on Jun. 25, 2010, now Pat. No. 8,996,608, which is a continuation of application No. 11/039,896, filed on Jan. 24, 2005, now Pat. No. 7,765,248.

(51) Int. Cl.
*G06F 16/958* (2019.01)
*H04N 1/00* (2006.01)
*H04L 67/02* (2022.01)
*H04L 67/51* (2022.01)

(52) U.S. Cl.
CPC ..... *H04N 1/00464* (2013.01); *H04N 1/00204* (2013.01); *H04N 2201/001* (2013.01); *H04N 2201/0094* (2013.01)

(58) Field of Classification Search
CPC ......... H04N 1/00204; H04N 2201/001; H04N 2201/0094
See application file for complete search history.

(56) References Cited

U.S. PATENT DOCUMENTS

| | | |
|---|---|---|
| 6,209,048 B1 * | 3/2001 | Wolff ............... H04L 29/06 709/203 |
| 6,748,439 B1 | 6/2004 | Monachello et al. |
| 7,194,433 B1 | 3/2007 | Hyakutake et al. |
| 2001/0012411 A1 | 8/2001 | Miyazaki et al. |
| 2002/0062346 A1 | 5/2002 | Chen |
| 2003/0014368 A1 | 1/2003 | Leurig et al. |
| 2003/0018644 A1 | 1/2003 | Bala et al. |
| 2003/0078965 A1 | 4/2003 | Cocotis et al. |
| 2003/0081788 A1 | 5/2003 | Simpson et al. |
| 2003/0135587 A1 | 7/2003 | Fisher et al. |
| 2003/0137693 A1 | 7/2003 | Nishio |
| 2003/0218771 A1 | 11/2003 | Mihira |
| 2003/0225894 A1 | 12/2003 | Ito |
| 2004/0083260 A1 | 4/2004 | Kobayashi |
| 2004/0128349 A1 | 7/2004 | Maruyama |
| 2004/0136032 A1 | 7/2004 | Kizaki et al. |
| 2004/0181662 A1 | 9/2004 | Kanai et al. |
| 2004/0221231 A1 | 11/2004 | Madril, Jr. et al. |
| 2005/0108323 A1 | 5/2005 | Taylor et al. |
| 2005/0138065 A1 | 6/2005 | Ciriza |

FOREIGN PATENT DOCUMENTS

| | | |
|---|---|---|
| JP | 2003-076518 | 3/2003 |
| JP | 2003-345920 | 12/2003 |
| JP | 2004-5478 | 1/2004 |

* cited by examiner

| BOOKMARK NAME | BOOKMARK DESTINATION URL |
|---|---|
| APPLICATION 1 | http://pc/application |
| ⋮ | ⋮ |

30

| HTTP SESSION ID | SOAP SESSION ID | SESSION DATA |
|---|---|---|
| 111 | 222 | × × × |
| ⋮ | ⋮ | ⋮ |

| Web SERVICE URL |
|---|
| http://mfp/service |

| HTTP SESSION ID | SOAP SESSION ID | SESSION DATA | Web SERVICE URL |
|---|---|---|---|
| 111 | 222 | × × × | http://mfp/service |
| ⋮ | ⋮ | ⋮ | ⋮ |

| SOAP SESSION ID | SESSION DATA |
|---|---|
| 222 | × × × |
| ⋮ | ⋮ |

FIG.12

```
GET http://pc/application/ HTTP/1.1
```

FIG.13

```
<soapenv:Envelope>
 <soapenv:Body>
   <getSoapSessionId />
 </soapenv:Body>
</soapenv:Envelope>
```

FIG.14

```
<soapenv:Envelope>
 <soapenv:Body>
   <getSoapSessionIdResponse>
     <returnValue>222</returnValue>
   </getSoapSessionIdResponse>
 </soapenv:Body>
</soapenv:Envelope>
```

FIG.15

```
HTTP/1.1 200 OK
Content-Type:text/html

<html>
<body>
<form method="POST" action="/application/next">
<input type="hidden" name="httpSessionId" value="111">
<input type="text" name="input">
</form>
</body>
</html>
```

FIG.16

```
POST http://pc/application/next HTTP/1.1
Content-Type: application/x-www-form-urlencoded httpSessionId=111&input=xxx
```

FIG.17

```
<soapenv:Envelope>
  <soapenv:Body>
    <doCommand>
      <soapSessionId>222</soapSessionId>
      <sessionData>xxx</sessionData>
    </doCommand>
  </soapenv:Body>
</soapenv:Envelope>
```

FIG.18

```
<soapenv:Envelope>
 <soapenv:Body>
  <doCommandResponse>
   <returnValue>yyy</returnValue>
  </doCommandResponse>
 </soapenv:Body>
</soapenv:Envelope>
```

FIG.19

```
HTTP/1.1 200 OK
Content-Type:text/html

<html>
<body>
<form method="POST" action="application/next">
<input type="hidden" name="httpSessionId" value="111">
<p>yyy</p>
</form>
</body>
</html>
```

FIG.23

```
HTTP/1.1 200 OK
Content-Type:text/html

<html>
<body>
<form method="POST" action="/application/next">
<input type="text" name="serviceUrl">
</form>
</body>
</html>
```

FIG.24

```
POST http://pc/application/next HTTP/1.1
Content-Type: application/x-www-form-urlencoded serviceUrl=http://mfp/service
```

FIG.26

```
HTTP/1.1 307 OK
Location: http://localhost/getServiceUrl?applicationUrl=http://pc/application/next
```

FIG.27

```
GET http://localhost/getServiceUrl?applicationUrl=http://pc/application/next HTTP/1.1
```

FIG.28

```
HTTP/1.1 307 OK
Location: http://pc/application/next?serviceUrl=http://mfp/service
```

FIG.29

```
GET http://pc/application/next?serviceUrl=http://mfp/service HTTP/1.1
```

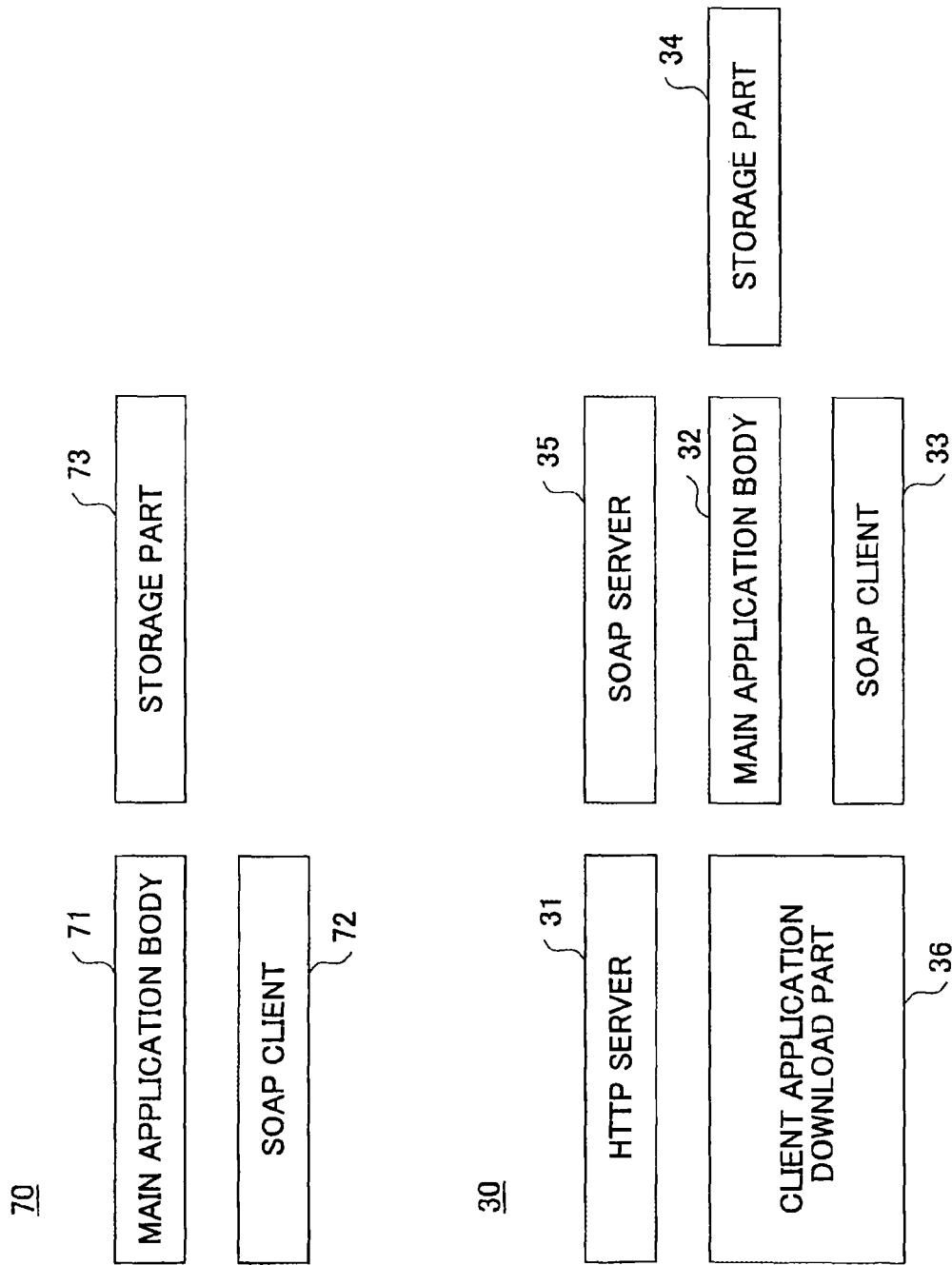

FIG.40

```
<soapenv:Envelope>
 <soapenv:Body>
  <getServiceUrl />
 </soapenv:Body>
</soapenv:Envelope>
```

FIG.41

```
<soapenv:Envelope>
 <soapenv:Body>
  <getServiceUrlResponse>

<returnValue>http://mfp/service</returnValue>
  </getServiceUrlResponse>
 </soapenv:Body>
</soapenv:Envelope>
```

FIG.42

```
<soapenv:Envelope>
 <soapenv:Body>
  <doCommand>
   <input> xxx </input>

<serviceUrl>http://mfp/service</serviceUrl>
  </doCommand>
 </soapenv:Body>
</soapenv:Envelope>
```

SERVICE PROVIDING SYSTEM FOR SCANNING OVER A NETWORK

CROSS-REFERENCE TO RELATED APPLICATIONS

This application is a divisional of U.S. Ser. No. 14/626,553 filed Feb. 19, 2015, which is a divisional of U.S. Ser. No. 12/823,928 filed Jun. 25, 2010, now U.S. Pat. No. 8,996,608 issued Mar. 31, 2015, which is a continuation of U.S. Ser. No. 11/039,896 filed Jan. 24, 2005, now U.S. Pat. No. 7,765,248 issued Jul. 27, 2010, which claims priority under 35 U.S.C. 119 to Japanese Patent Application No. 2004-018813 filed Jan. 27, 2004 and No. 2005-001573 filed Jan. 6, 2005. The entire contents of each of these documents are hereby incorporated herein by reference.

BACKGROUND OF THE INVENTION

1. Field of the Invention

The present invention generally relates to service providing methods, service provider apparatuses, information processing methods and apparatuses, and computer-readable storage media, and more particularly to a service providing method and a service provider apparatus for providing services, an information processing method and an information processing apparatus for processing information, and a computer-readable storage medium which stores a program for causing a computer to provide services or to process information.

2. Description of the Related Art

Recently, an image forming apparatus (hereinafter referred to as a composite apparatus) integrally comprising the functions of a printing apparatus (or printer), a copying apparatus, a facsimile apparatus, a scanning apparatus (or scanner) and the like, has been developed. Such a composite apparatus has a display part, a printing part, an image pickup (or imaging) part and the like that are provided within a housing. In addition, the composite apparatus is provided with 4 kinds of application programs (hereinafter simply referred to as applications) respectively corresponding to the printing apparatus, the copying apparatus, the facsimile apparatus and the scanning apparatus. The composite apparatus functions as the printing apparatus, the copying apparatus, the facsimile apparatus and the scanning apparatus by switching the applications.

An example of the conventional composite apparatus is proposed in a Japanese Laid-Open Patent Application No. 2002-84383.

However, when a new application is to operate in the conventional composite apparatus, there was a problem in that an exclusive developing environment, testing environment and the like are required in order to develop the new application within the composite apparatus.

In addition, there was a problem in that it is difficult to guarantee the security of the newly developed application.

SUMMARY OF THE INVENTION

Accordingly, it is a general object of the present invention to provide a novel and useful service providing method, service provider apparatus, information processing method, information processing apparatus and computer-readable storage medium, in which the problems described above are suppressed.

Another and more specific object of the present invention is to provide a service providing method, a service provider apparatus, an information processing method, an information processing apparatus for processing information and a computer-readable storage medium, which enable easy expansion (or extension) of the functions of the service provider apparatus.

Still another and more specific object of the present invention is to provide a service provider apparatus comprising a first application configured to execute a process related to a Web page or Web contents; and a service providing part configured to provide services, where the first application sends a request to a second application included in another apparatus, and the service providing part receives a service providing request related to the request from the second application, and provides a service depending on the service providing request, so as to expand functions of the services provided by the service provider apparatus. According to the service provider apparatus of the present invention, it is possible to easily expand (or extend) the functions of the service provider apparatus.

A further object of the present invention is to provide an information processing apparatus comprising a second application, where the second application receives a request from a first application that executes a process related to a Web page or Web contents and is included in another apparatus, and utilizes services provided by a service providing part included in the other apparatus depending on the request, so as to expand functions of the services provided by the other apparatus. According to the information processing apparatus of the present invention, it is possible to easily expand (or extend) the functions of the service provider apparatus.

Another object of the present invention is to provide a service providing method for a service provider apparatus having a first application configured to execute a process related to a Web page or Web contents, and a service providing part configured to provide services, comprising a request sending step sending a request from the first application to a second application included in another apparatus; and a service providing step receiving a service providing request related to the request from the second application, and providing a service depending on the service providing request, so as to expand functions of the services provided by the service provider apparatus. According to the service providing method of the present invention, it is possible to easily expand (or extend) the functions of the service provider apparatus.

Still another object of the present invention is to provide an information processing method for an information processing apparatus having a second application, comprising a request receiving step receiving, by the second application, a request from a first application that executes a process related to a Web page or Web contents and is included in another apparatus; and a utilizing step utilizing, by the second application, services provided by a service providing part included in the other apparatus depending on the request, so as to expand functions of the services provided by the other apparatus. According to the information processing method of the present invention, it is possible to easily expand (or extend) the functions of the service provider apparatus.

Another object of the present invention is to provide a computer-readable storage medium which stores a program for causing a computer to function as a service provider apparatus having a first application configured to execute a process related to a Web page or Web contents, and a service providing part configured to provide services, the program comprising a request sending procedure causing the computer to send a request from the first application to a second application included in another apparatus; and a service providing procedure causing the computer to receive a service providing request related to the request from the second application, and providing a service depending on the service providing request, so as to expand functions of the services provided by the service provider apparatus. According to the computer-readable storage medium of the present invention, it is possible to easily expand (or extend) the functions of the service provider apparatus.

Still another object of the present invention is to provide a computer-readable storage medium which stores a program for causing a computer to function as an information processing apparatus having a second application, the program comprising a request receiving procedure causing the computer to receive, by the second application, a request from a first application that executes a process related to a Web page or Web contents and is included in another apparatus; and a utilizing procedure causing the computer to utilize, by the second application, services provided by a service providing part included in the other apparatus depending on the request, so as to expand functions of the services provided by the other apparatus. According to the computer-readable storage medium of the present invention, it is possible to easily expand (or extend) the functions of the service provider apparatus.

Other objects and further features of the present invention will be apparent from the following detailed description when read in conjunction with the accompanying drawings.

BRIEF DESCRIPTION OF THE DRAWINGS

FIG. 12 is a diagram showing an HTTP request;

FIG. 13 is a diagram showing a SOAP request;

FIG. 14 is a diagram showing a SOAP response including a SOAP session ID;

FIG. 15 is a diagram showing an HTML response including an HTTP session ID;

FIG. 16 is a diagram showing an HTTP request including an HTTP session ID and input data;

FIG. 17 is a diagram showing a SOAP request including a SOAP session ID and session data;

FIG. 18 is a diagram showing a SOAP response including a portion of session data;

FIG. 19 is a diagram showing an HTML response including an HTTP session ID and a portion of session data;

FIG. 23 is a diagram showing an HTML form requesting input of the Web service URL;

FIG. 24 is a diagram showing a result of the form including the Web service URL;

FIG. 26 is a diagram showing a direct request including a Web application URL for URL determination;

FIG. 27 is a diagram showing an HTTP request including a Web application URL for URL determination;

FIG. 28 is a diagram showing a direct request including a Web service URL;

FIG. 29 is a diagram showing an HTTP request including a Web service URL;

FIG. 36 is a diagram for explaining a functional structure of a client application;

FIG. 37 is a diagram for explaining a functional structure of a Web application;

FIG. 40 is a diagram showing a SOAP request related to an URL inquiry of a Web service;

FIG. 41 is a diagram showing a SOAP response related to a URL inquiry of a Web service; and FIG. 42 is a diagram showing a SOAP response related to a URL notification of a Web service.

DESCRIPTION OF THE PREFERRED EMBODIMENTS

Figure 1:
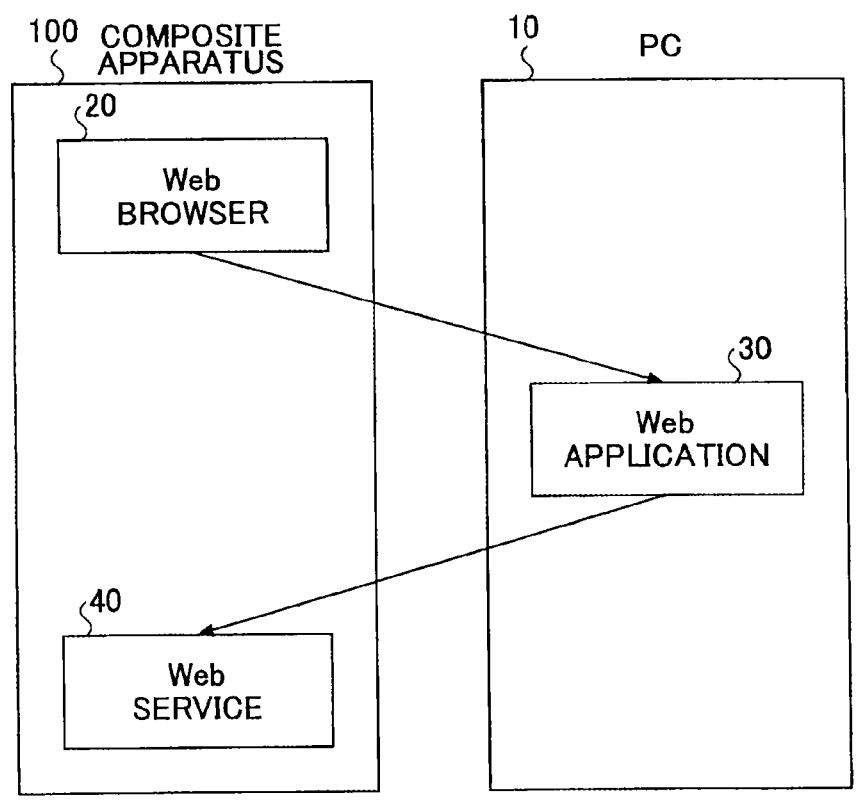
FIG. 1 is a system block diagram for generally explaining the present invention.

As will be described hereunder with reference to the embodiments, a service provider apparatus according to one aspect of the present invention is provided with a first application for executing a process related to a Web page or Web contents, and a service providing part or means for providing services. The first application makes a request to a second application that is included in another apparatus. The service providing part or means receives a service providing request related to the request and received from the second application, and provides a service depending on the service providing request, so as to expand (or extend) functions of the services provided by the service provider apparatus.

As will be described later, the first application in this case corresponds to Web browser 20 or, the Web browser 20 that is downloaded (embedded) with a client application 70 or, the client application 70, for example. In addition, the service providing part or means corresponds to a Web service 40, and the second application corresponds to a Web application 30, for example. Furthermore, the service provider apparatus corresponds to a composite apparatus 100, for example. The other apparatus corresponds to a personal computer (PC) 10, for example.

An information processing apparatus according to another aspect of the present invention is provided with a second application. The second application receives a request from a first application that is included in another apparatus and executes a process related to a Web page or Web contents. Depending on the received request, the second application utilizes a service provided by a service providing part or means included in the other apparatus, so as to expand (or extend) functions of the service provided by the other apparatus.

As will be described later, the first application in this case corresponds to the Web browser 20 or, the Web browser 20 that is downloaded (embedded) with the client application 70 or, the client application 70, for example. In addition, the service providing part or means corresponds to the Web service 40, and the second application corresponds to the Web application 30, for example. Moreover, the information processing apparatus corresponding to the PC 10, for example. The other apparatus corresponds to the composite apparatus 100, for example.

According to the present invention, it is possible to easily expand the functions of the apparatus (service provider apparatus).

Further, the object of the present invention can also be realized by a service providing method, an information processing method and a computer-readable storage medium which stores a service providing program or an information processing program.

An image forming apparatus recited in the claims may correspond to a scanning apparatus (or scanner) or, a printing apparatus (or printer) or, the composite apparatus 100 or the like.

Next, a description will be given of various embodiments of a service providing method, a service provider apparatus, information processing method and apparatus, and a computer-readable storage medium according to the present invention, by referring to the drawings.

First Embodiment

FIG. 1 is a system block diagram for generally explaining the present invention. As shown in FIG. 1, a user (or operator) of the composite apparatus 100 can use a Web service 40 that is included in the composite apparatus 100 by utilizing the Web application 30 that is included in the personal computer (PC) 10 via the Web browser 20.

By employing the structure shown in FIG. 1, it is possible to develop and test the Web application 30 in the PC 10 having a suitable developing environment and a suitable testing environment. In addition, it is possible to solve the problem of security by utilizing the Web application 30 that operates in the PC 10 which tested the Web application 30.

Figure 2:
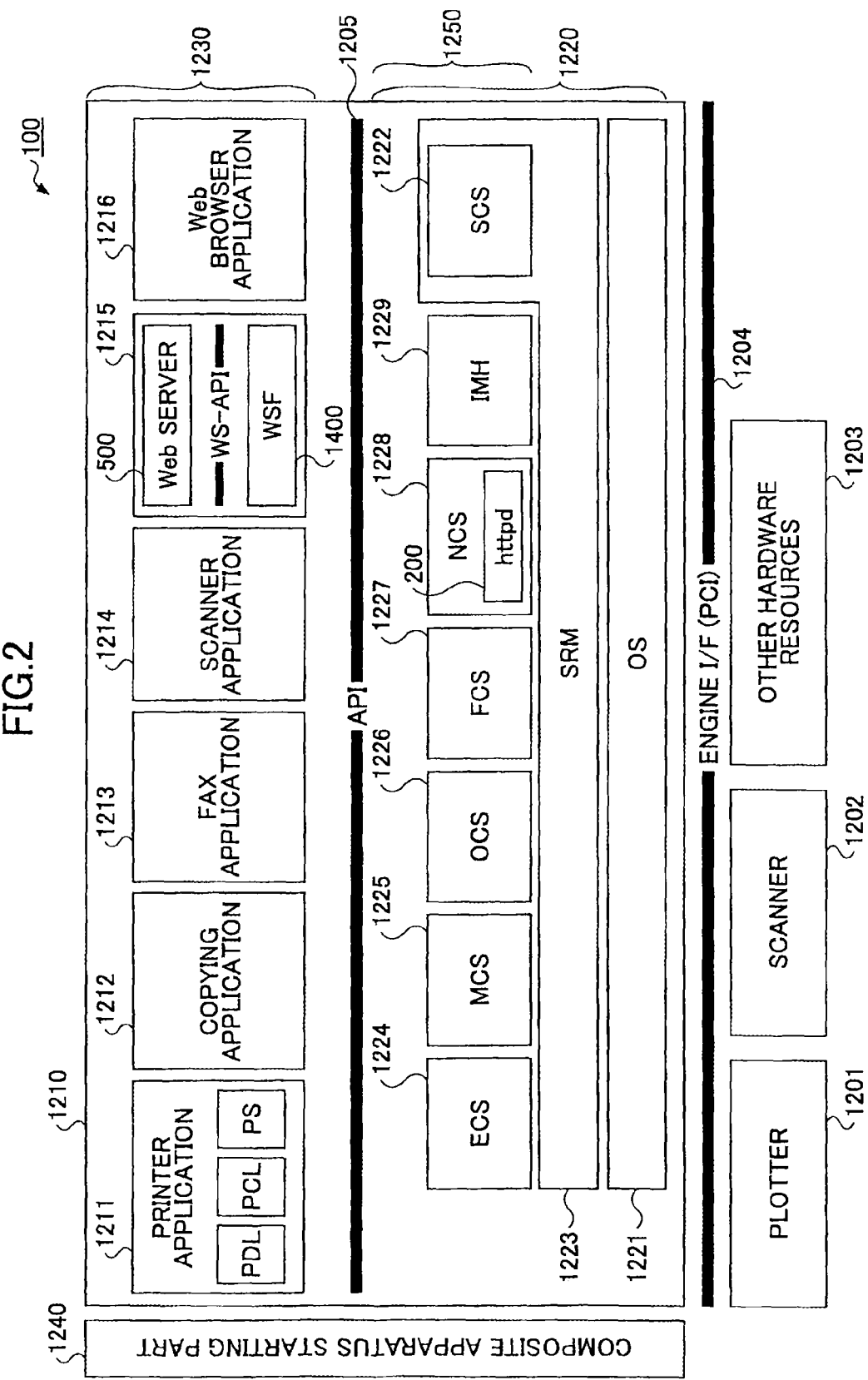
FIG. 2 is a diagram for explaining a functional structure of a composite apparatus.

Next, a description will be given of a functional structure of the composite apparatus 100, by referring to FIG. 2. FIG. 2 is a diagram for explaining the functional structure of the composite apparatus 100.

The composite apparatus 100 shown in FIG. 2 includes a plotter 1201, a scanner 1202, other hardware resources 1203 such as a facsimile, a software group 1210 and a composite apparatus starting (or booting) part 1240. The software group 1210 includes a platform 1220 and applications 1230.

The composite apparatus starting part 1240 is first executed when a power supply of the composite apparatus 100 is turned ON, and starts the platform 1220 and the applications 1230.

The platform 1220 includes control services 1250, a System Resource Manager (SRM) 1223 and an Operating System (OS) 1221. The control services 1250 analyze processing requests from the applications 1230, and generate acquisition requests to acquire the hardware resources. The SRM 1223 manages one or a plurality of hardware resources, and carries out an arbitration of the acquisition requests from the control services 1250.

The control services 1250 are formed by a plurality of service modules. More particularly, the control services 1250 are formed by a System Control Service (SCS) 1222, an Engine Control Service (ECS) 1224, a Memory Control Service (MCS) 1225, an Operation panel Control Service (OCS) 1226, a Fax Control Service (FCS) 1227, a Network Control Service (NCS) 1228 and an Imaging Memory Handler (IMH) 1229. The platform 1220 includes an Application Program Interface (API) 1205 that enables reception of the processing requests from the applications 1230 by predefined functions.

The OS 1221 is formed by a UNIX (registered trademark) operating system or the like, and simultaneously executes software of the platform 1220 and the applications 1230 as processes. By using an open-source UNIX operating system, it is possible to secure program safety, and cope with networks, so that source codes can be acquired with ease. In addition, it is unnecessary to pay royalties for the OS and the Transmission Control Protocol/Internet Protocol (TCP/IP), thereby facilitating outsourcing.

The SRM 1223 carries out the system control and the resource management together with the SCS 1222. The SRM 1223 carries out an arbitration of requests received from a higher level (or layer) that utilizes the hardware resources including an engine part such as the scanner and the plotter, a memory, a Hard Disk Drive (HDD) file, and a host Input/Output (I/O) interface (I/F) (Centronics I/F, network I/F, IEEE 13941 I/F, etc.), and executes the requests.

More particularly, the SRM 1223 judges whether or not the requested hardware resource exists and is usable (not in use by another request), and if in the affirmative, notifies the higher level (or layer) that the requested hardware resource is usable. In addition, the SRM 1223 may carry out a scheduling of the hardware resources that are used with respect to the request from the higher level (or layer), and directly execute the requested contents (for example, transporting paper and forming an image by a printer engine, securing a memory, generating a file, etc.).

The SCS 1222 carries out a plurality of functions that include application management (function 1), operating part control (function 2), system screen display (job list screen, counter display screen, etc.) (function 3), Light Emitting Diode (LED) display (function 4), resource management (function 5), interrupt application control (function 6) and the like. The application management (function 1) registers applications, and notifies information related to registered applications to other applications. The operating part control (function 2) makes an exclusive control of the rights of the applications to use the operating part. The system screen display (function 3) displays a warning screen corresponding to a state of the engine part, depending on contents of the request from the application that has the right to use the operating part. The LED display (function 4) controls display of a system LED such as warning LEDs and application keys. The resource management (function 5) carries out a service for the exclusive control of the engine resources (scanner, staple, etc.) that must be subjected to the exclusive control when the application (ECS) executes a job. The interrupt application control (function 6) carries out a control and a service for operating a specific application with priority.

The ECS 1224 controls the plotter 1201, the scanner 1202 and the other hardware resources 1203 such as the engine part, and carries out an image reading and printing operation, a state notification, a jam recovery and the like.

The MCS 1225 carries out a memory control. More particularly, the MCS 1225 carries out control processes such as acquiring and releasing an image memory, utilizing the HDD, compressing and expanding image data.

The OCS 1226 is made up of a module that controls an operation panel forming an information transmitting part or means between the operator and a main body control. The processes carried out by OCS 1226 include a process of notifying key operating events of the operator, a process of providing library functions to be used by each application to form a Graphic User Interface (GUI), a process of managing information of the formed GUI for each application, and a process of reflecting the display on the operation panel.

The FCS 1227 provides the Application Program Interface (API) for facsimile transmission and reception using a Public Switched Telephone Network or Integrated Services Digital Network (PSTN/ISDN) from each application level (or layer) of the system controller, registration and/or reference of various facsimile data managed in a backup SRAM (BKM), facsimile reading, and facsimile reception printing.

The NCS 1228 is made up of a module group for providing services that may be used in common by the applications which require the network I/F. The processes carried out by the NCS 1228 include distributing the data received from the network by each protocol to each application, and intervening when the data is sent from the application to the network.

For example, the NCS 1228 may use a Hypertext Transfer Protocol Daemon (httpd) 200, of a plurality of protocols, so as to control a data communication with a network equipment that is connected via the Internet by a HyperText Transfer Protocol (HTTP), and start a processing part corresponding to a Web service specified by an HTTP request header by a function call, so as to notify a result of the process carried out by this Web service to the network equipment by an HTTP response. The Web service is provided according to a message that is described by an eXtensible Markup Language (XML), for example.

The IMH 1229 maps the image data from a virtual memory region (user virtual space) to a physical memory. Depending on the process that is started, the IMH 1229 makes a system call, maps the virtual memory region for the process, and releases the virtual memory region that is mapped after the process ends.

The applications 1230 include a Web browser application 1216 for the Web browser 20 which will be described later, a Web service processing application 1215 for the Web service, a scanner application 1214 for the scanner, a facsimile application 1213 for the facsimile, a copying application 1212 for the copy, and a printer application 1211 for the printer in the Page Description Language (PDL), Printer Command Language (PCL) and Post Script (PS). It is possible to install a new application via a network to which the composite apparatus 100 is connected by the NCS 1228. In addition, the applications 1230 may be added or deleted in units of one or more applications.

The Web service processing application 1215 includes a Web server 500 and a Web Service Function (WSF) 1400. The Web server 500 receives an HTTP request that requests a Web service, and provides the Web service by sending an HTTP response. The WSF 1400 carries out a predetermined process using the control services 1250 via the API, and provides a result of the predetermined process as a Web service via a Web Service Application Program Interface (WS-API).

In this embodiment, the Web service 40 and the like are installed in the WSF 1400.

The composite apparatus 100 centrally processes in the platform 1220 the processes that are required in common by each of the applications.

Figure 3:
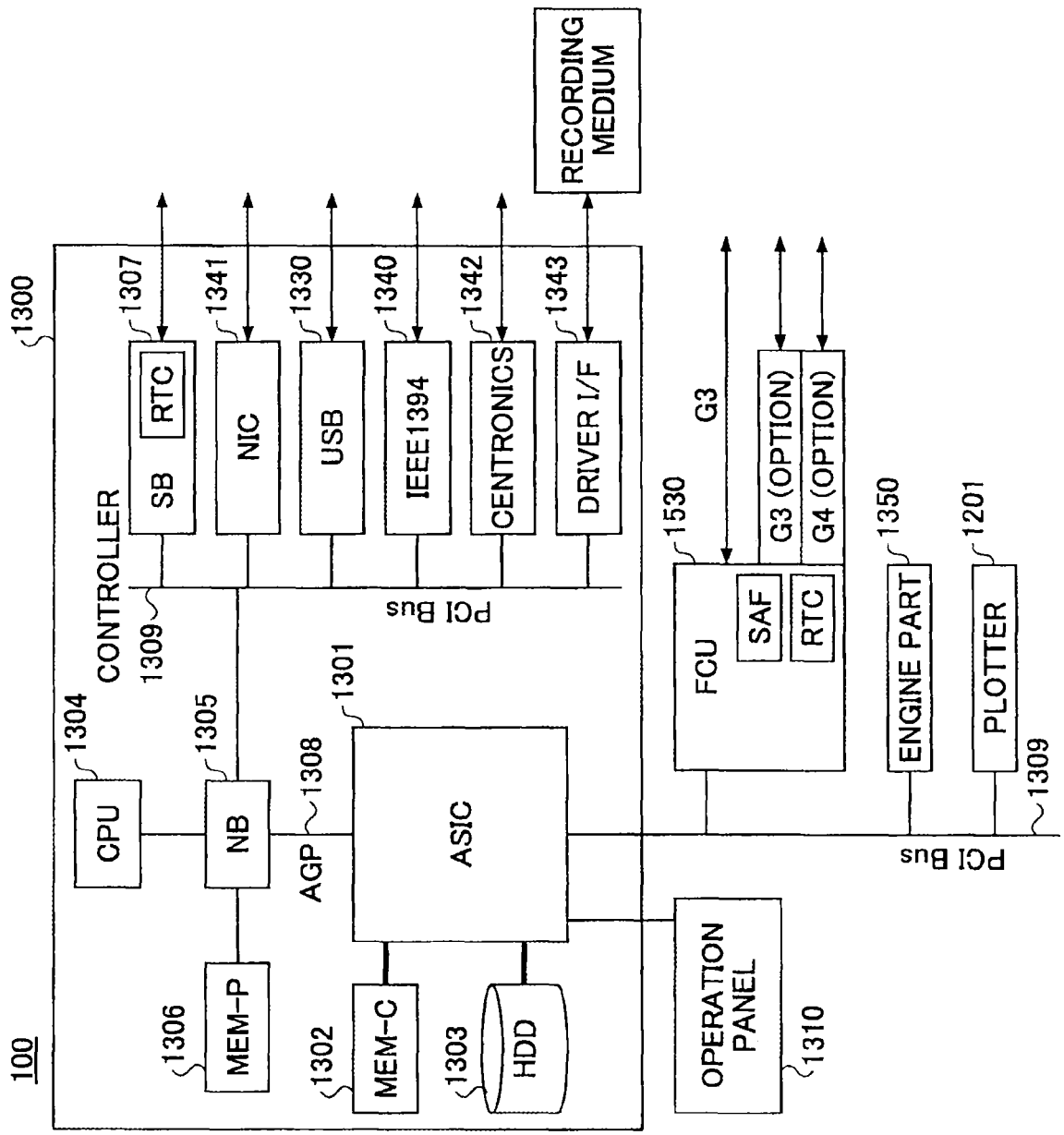
FIG. 3 is a system block diagram for explaining a hardware structure of the composite apparatus.

Next, a description will be given of a hardware structure of the composite apparatus 100, by referring to FIG. 3. FIG. 3 is a system block diagram for explaining the hardware structure of the composite apparatus 100.

As shown in FIG. 3, the composite apparatus 100 includes an operation panel 1310, a FAX control unit (FCU) 1530, an engine part 1350 (connected to the scanner 1202, etc.), the plotter 1201, and an Application Specific Integrated Circuit (ASIC) 1301 of a controller 1300 that are connected via a Peripheral Component Interconnect (PCI) bus 1309 or the like.

In the controller 1300, a local memory (MEM-C) 1302, a HDD 1303 and the like are connected to the ASIC 1301. The ASIC 1301 and a Central Processing Unit (CPU) 1304 are connected via a North Bridge (NB) 1305 of a CPU chip set, because the interface of the CPU 1304 itself is unknown.

The ASIC 1301 and the NB 1305 are not simply connected via the PCI, but are connected via an Accelerated Graphics Port (AGP) 1308. The ASIC 1301 and the NB 1305 are connected via the AGP 1308 to prevent a performance deterioration that would otherwise occur if the two were connected by the low-speed PCI, since the composite apparatus 100 is designed to execute and control a plurality of processes forming the platform 122 and the applications 1230 shown in FIG. 2.

The CPU 1304 controls the general operation of the composite apparatus 100. More particularly, the CPU 1304 starts and executes, on the OS 1221, the SCS 1222, SRM 1223, ECS 1224, MCS 1225, OCS 1226, FCS 1227, NCS 1228 and IMH 1229 which form the platform 1220, as processes. The CPU 1304 also starts and executes, on the OS 1221, the printer application 1211, the copy application 1212, the facsimile application 1213, the scanner application 1214, the Web service processing application 1215 and the Web browser application 1216 which form the applications 1230.

The NB 1305 is provided to connect the CPU 1304 to a system memory (MEM-P) 1306, a South Bridge (SB) 1307, a Network Interface Card (NIC) 1341, a Universal Serial Bus (USB) 1330, an IEEE1394 1340, a Centronics 1342, a driver interface (I/F) 1343 and the ASIC 1301.

The MEM-P 1306 is used as a plotting memory and the like of the composite apparatus 100. The SB 1307 connects the NB 1305 to a ROM PCI device, a peripheral device and the like. The MEM-C 1302 is used as an image buffer for copying, a code buffer and the like. The ASIC 1301 includes image processing hardware elements for carrying out image processing.

The driver I/F 1343 is used to read programs, applications or the like stored in a recording medium that is inserted into the composite apparatus 100, and to install the read programs, applications or the like in the composite apparatus 100. The recording medium is not limited to a particular type, and for example, may be formed by an SD memory card, smart media, multi-media card, compact flash (registered trademark) and the like.

The HDD 1303 forms a storage for storing image data, programs, font data, forms, documents and the like. The operation panel 1310 includes keys for accepting an input operation made by the operator, and a display part for displaying messages and the like with respect to the operator. In this embodiment, the Web page and the like that displayed by the Web browser 20 are displayed on the operation panel 1310.

The ASIC 1301 includes a RAM interface for connecting to the MEM-C 1302, and a hard disk interface for connecting to the HDD 1303. When inputting and outputting image data with respect to the storage part formed by the MEM-C 1302 or the HDD 1303, the input or output destination is switched to the corresponding RAM interface or the hard disk interface.

The AGP 1308 forms a bus interface for a graphics accelerator card that is designed to carry out a graphics process at a high speed. The AGP 1308 enables a high-speed graphics processing by the graphics accelerator card by directly accessing the MEM-P 1306 with a high throughput.

Figure 4:
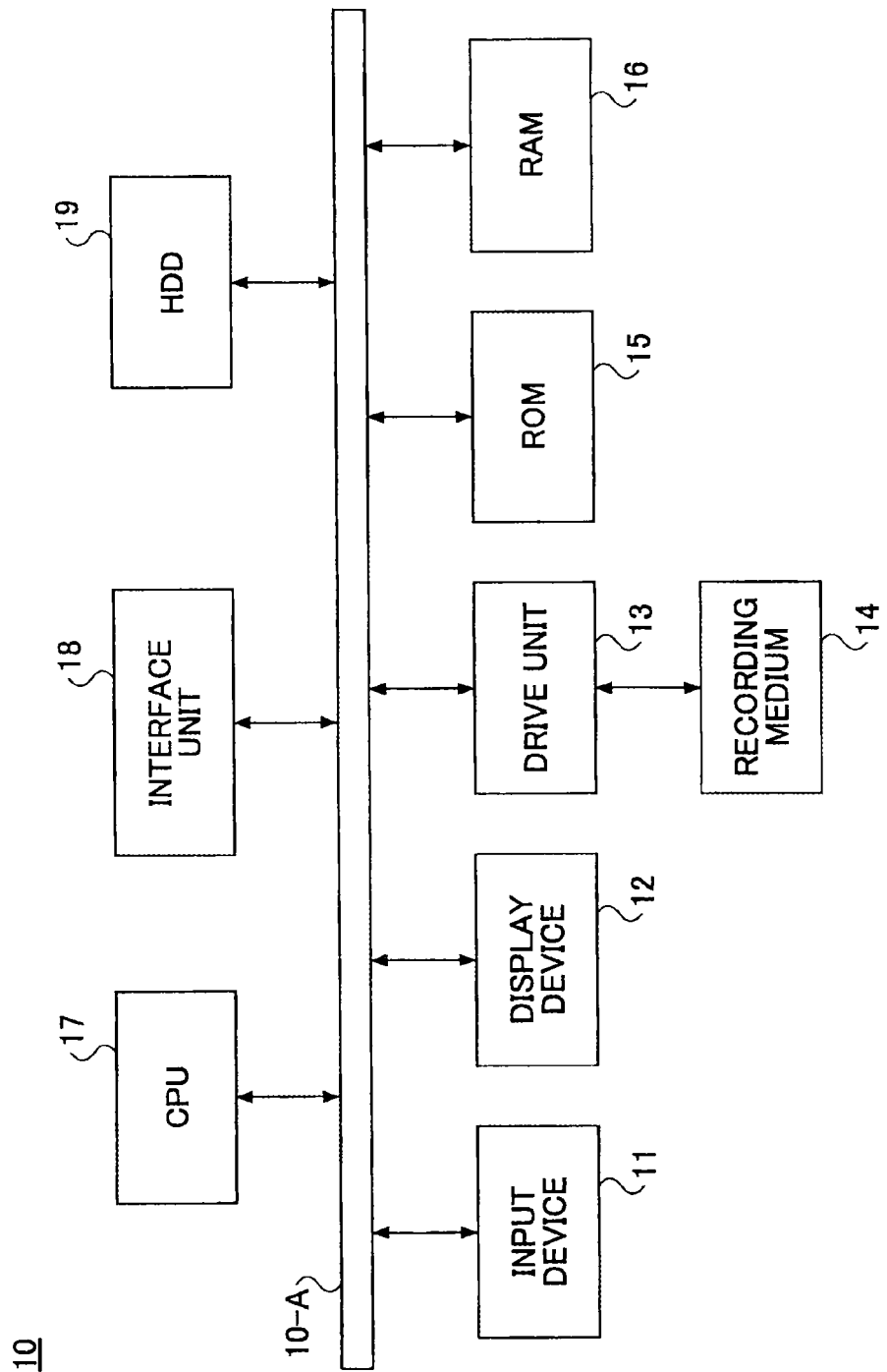
FIG. 4 is a system block diagram showing a hardware structure of a personal computer (PC)

Next, a description will be given of a hardware structure of the PC 10, by referring to FIG. 4. FIG. 4 is a system block diagram showing the hardware structure of the PC 10.

The PC 10 includes an input device 11, a display device 12, a driver unit 13, a Read Only Memory (ROM) 15, a Random Access Memory (RAM) 16, a CPU 17, an interface unit 18, and an HDD 19 that are connected via a bus 10-A. A recording medium 14 is loaded into the driver unit 13.

The input device 11 is formed by a keyboard, a mouse or the like that is operated by the operator of the PC 10. Various operation signals are input to the PC 10 when the input device 11 is operated by the operator. The display device 12 is formed by a Liquid Crystal Display (LCD) or the like which displays various information with respect to the operator of the PC 10. The interface unit 18 connects the PC 10 to a network or the like.

An application program corresponding to the Web application 30, a main program that controls the general operation of the PC 10, and the like may be provided with respect to the PC 10 by the recording medium 14 or, downloaded to the PC 10 via a network. In the former case, the application program, the main program and the like are installed into the HDD 19 from the recording medium 14 via the driver unit 13. The recording medium 14 may be a CD-ROM that is loaded into the driver unit 13.

The ROM 15 stores data and the like. The RAM 16 stores the application program, the main program and the like that are read from the HDD 19 when starting the PC 10. The CPU 17 carries out processes by executing the application program, the main program and the like that are read and stored in the RAM 16.

Figures 5, 6, 7:
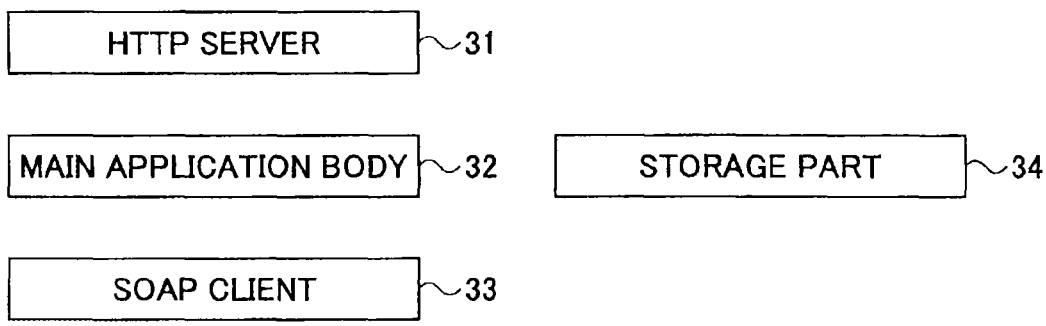
FIG. 5 is a diagram for explaining a table managed by a Web browser.
FIG. 6 is a diagram for explaining a functional structure of a Web application.
FIG. 7 is a diagram for explaining tables managed by a storage part of the Web application.

Next, a description will be given of a table managed by the Web browser 20, by referring to FIG. 5. FIG. 5 is a diagram for explaining the table managed by the Web browser 20.

As shown in FIG. 5, the table managed by the Web browser 20 includes a bookmark name and a bookmark destination Uniform Resource Locators (URL), as the items. A name of the bookmark destination is stored in the bookmark name. The URL of the bookmark destination is stored in the bookmark destination URL.

Next, a description will be given of a functional structure of the Web application 30, by referring to FIG. 6. FIG. 6 is a diagram for explaining the functional structure of the Web application 30.

As shown in FIG. 6, the Web application 30 includes an HTTP server 31, a main application body 32, a Simple Object Access Protocol (SOAP) client 33, and a storage part 34.

The HTTP server 31 communicates with the Web browser 20 via the Internet or the like, and also communicates with the main application body 32. The main application body 32 forms a main portion of the functions of the application functions provided by the Web application 30. The main application body 32 communicates with the HTTP server 31 and the SOAP client 33.

The SOAP client 33 communicates with the main application body 32, and also communicates with the Web service 40 (or a SOAP server 41 of the Web service 41 to be described later) via the Internet or the like, for example. The storage part 34 is used by the HTTP server 31 or the main application body 32 or the SOAP client 33 when necessary. For example, the storage part 34 stores and manages tables which will be described later in conjunction with FIGS. 7 and 8, for example.

Next, a description will be given of tables managed by the storage part 34 of the Web application 30, by referring to FIG. 7. FIG. 7 is a diagram for explaining the tables managed by the storage part 34 of the Web application 30.

As shown in FIG. 7, one table managed by the storage part 34 of the Web application 30 includes an HTTP session ID, a SOAP session ID and session data as the items. In addition, as shown in FIG. 7, another table managed by the storage part 34 of the Web application 30 includes Web service URL as the item.

Identifier for identifying the sessions of the Web browser 20 and the Web application 30 are stored in the HTTP session ID. Identifiers for identifying the sessions of the Web application 30 and the Web service 40 are stored in the SOAP session ID. The input data input by the user of the composite apparatus via the Web browser 20 during a corresponding HTTP session are stored in the session data.

An identifier for identifying the Web service 40 is stored in the Web service URL.

Figures 8, 9, 10:
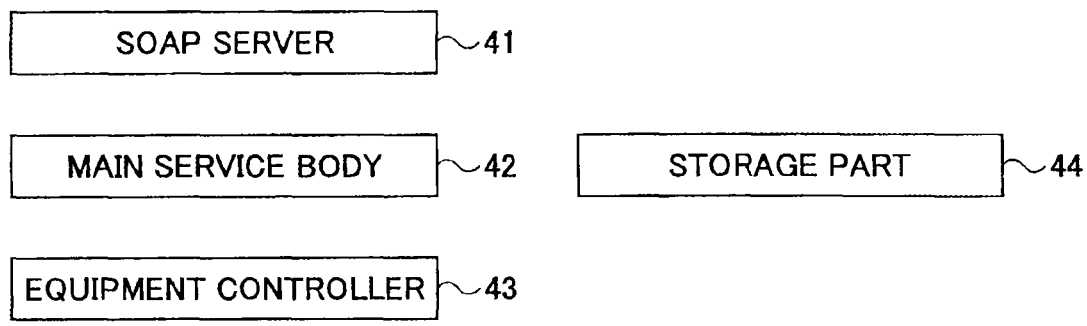
FIG. 8 is a diagram for explaining another table managed by the storage part of the Web application.
FIG. 9 is a diagram for explaining a functional structure of a Web service.
FIG. 10 is a diagram for explaining a table managed by the storage part of the Web service.

Next, a description will be given of another table managed by the storage part 34 of the Web application 30, by referring to FIG. 8. FIG. 8 is a diagram for explaining the other table managed by the storage part 34 of the Web application 30.

The single table shown in FIG. 8 integrally includes the 2 tables shown in FIG. 7. By employing this single table shown in FIG. 8, it is possible to manage the HTTP session ID and the Web service URL in correspondence with each other.

Next, a description will be given of a functional structure of the Web service 40, by referring to FIG. 9. FIG. 9 is a diagram for explaining the functional structure of the Web service 40.

As shown in FIG. 9, the Web service 40 includes a SOAP server 41, a main service body 42, an equipment controller 43 and a storage part 44.

The SOAP server 41 communicates with the Web application 30 (or the SOAP client 33 of the Web application 30)

via the Internet or the like, and also communicates with the main service body 42. The main service body 42 forms a main portion of the functions of the Web services provided by the Web service 40. The maim service body 42 communicates with the SOAP server 41 and the equipment controller 43.

The equipment controller 43 controls the equipments, and corresponds to the platform 1220 of the composite apparatus 100, for example. The storage part 44 is used by the SOAP server 41 or the main service body 42 or the equipment controller 43 when necessary. For example, the storage part 44 stores and manages a table which will be described later in conjunction with FIG. 10, for example.

Next, a description will be given of the table managed by the storage part 44 of the Web service 40, by referring to FIG. 10. FIG. 10 is a diagram for explaining the table managed by the storage part 44 of the Web service 40.

As shown in FIG. 10, the table that is managed by the storage part 44 of the Web service 40 includes a SOAP session ID and session data, as the items. An identifier for identifying the sessions of the Web application 30 (or the SOAP client 33 of the Web application 30) and the Web service 40 (or the SOAP server 41 of the Web service 40) is stored in the SOAP session ID. The session data sent from the Web application 30 during a corresponding SOAP session are stored in the session data.

Figure 11:
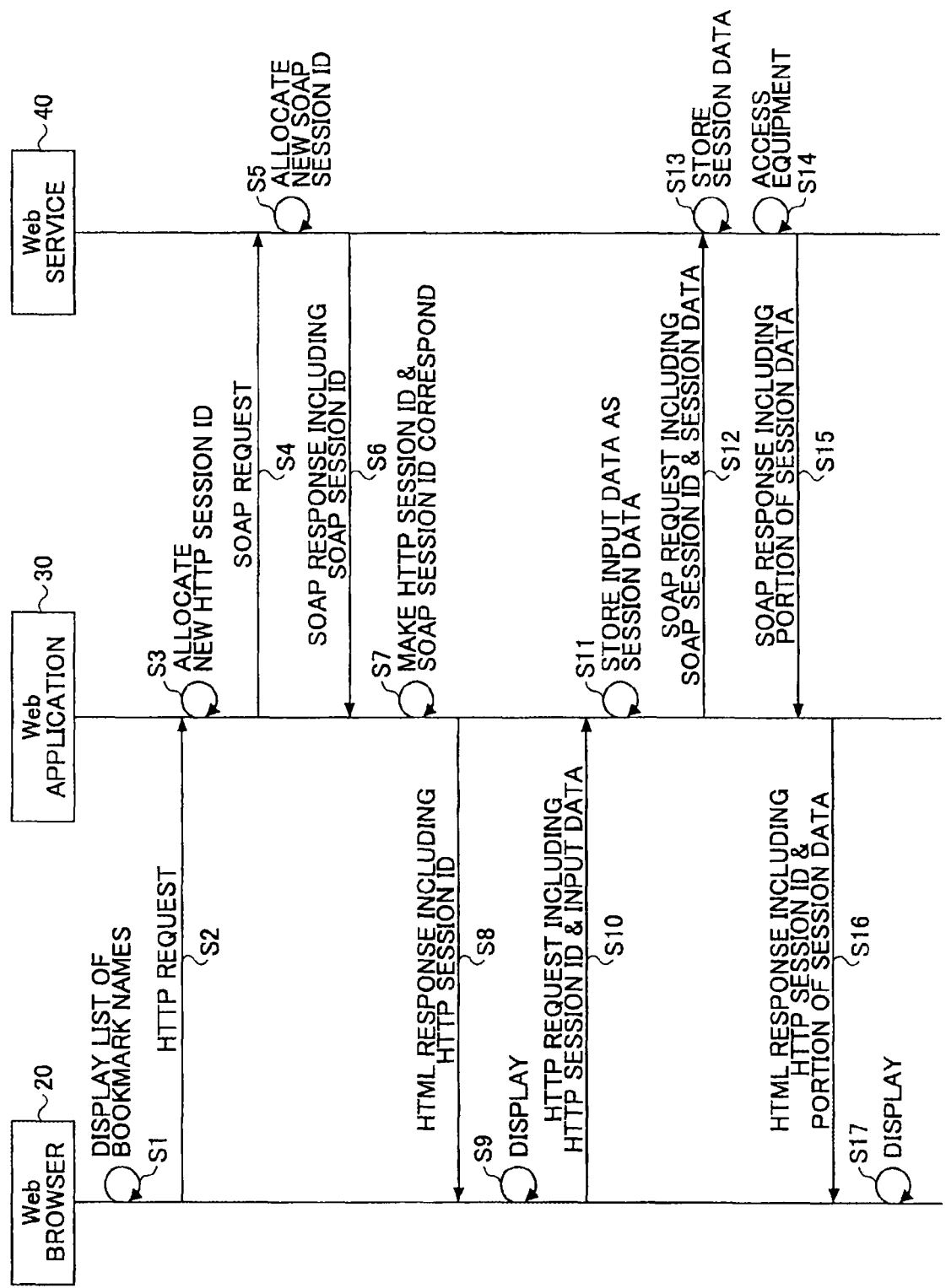
FIG. 11 is a sequence diagram for generally explaining a service providing process.

Next, a general description will be given of a process which utilizes the services provided by the Web service 40 included in the composite apparatus 100 itself, via the Web browser 20 of the composite apparatus 100, using the Web application 30 included in the PC 10, by referring to FIG. 11. FIG. 11 is a sequence diagram for generally explaining the service providing process.

First, the Web browser 20 included in the composite apparatus 100 displays a list of bookmark names depending on a request or the like from the user, in a step S1. When the user selects a bookmark, the Web browser 20 included in the composite apparatus 100 creates and sends an HTTP request shown in FIG. 12 which will be described later with respect to the URL of the selected bookmark, in a step S2.

When HTTP request shown in FIG. 12 is received from the Web browser 20 included in the composite apparatus 100, the Web application 30 included in the PC 10 allocates a new HTTP session ID to the session and stores the new HTTP session ID in the table shown in FIG. 7 or 8, in a step S3. In addition, with respect to the URL of the Web service 40 included in the composite apparatus 100 and registered in the table shown in FIG. 7 or 8 by a method which will be described later, the Web application 30 included in the PC 10 creates and sends a SOAP request shown in FIG. 13 which will be described later, in a step S4.

When the SOAP request shown in FIG. 13 is received from the Web application 30 included in the PC 10, the Web service 40 included in the composite apparatus 100 allocates a new SOAP session ID to the session and stores the new SOAP session ID in the table shown in FIG. 10, in a step S5. In addition, the Web service 40 included in the composite apparatus 100 creates a SOAP response shown in FIG. 14 which will be described later and including the new SOAP session ID allocated in the step S5, and returns the SOAP response to the Web application 30 included in the PC 10, in a step S6.

When the SOAP response shown in FIG. 14 including the new SOAP session ID is received from the Web service 40 included in the composite apparatus 100, the Web application 30 included in the PC 10 forms a correspondence between the HTTP session ID and the SOAP session ID, in a step S7. Further, the Web application 30 included in the PC 10 creates an HTML response shown in FIG. 15 which will be described later and including the HTTP session ID, and sends the HTML response to the Web browser 20 included in the composite apparatus 100, in a step S8.

When the HTML response shown in FIG. 15 including the HTTP session ID is received from the Web application 30 included in the PC 10, the Web browser 20 included in the composite apparatus 100 analyzes and displays the HTML, in a step S9. When the user makes an input operation on the form, the Web browser 20 included in the composite apparatus 100 creates an HTTP request shown in FIG. 16 which will be described later and including the HTTP session ID and the input data, and sends the HTTP request with respect to the specified URL within the form, in a step S10.

When the HTTP request shown in FIG. 16 including the HTTP session ID and the input data is received from the Web browser 20 included in the composite apparatus 100, the Web application 30 included in the PC 10 stores the input data included in the HTTP request in the table shown in FIG. 7 or 8, as the session data, in a step S11. In addition, the Web application 30 included in the PC 10 acquires the SOAP session ID corresponding to the HTTP session ID that is included in the HTTP request, from the table shown in FIG. 7 or 8, creates a SOAP request shown in FIG. 17 which will be described later and including the SOAP session ID and the session data, and sends the SOAP request with respect to the Web service URL included in the table shown in FIG. 7 or 8, in a step S12.

When the SOAP request shown in FIG. 17 including the SOAP session ID and the session data is received from the Web application 30 included in the PC 10, the Web service 40 included in the composite apparatus 100 stores the session data in the table shown in FIG. 10 using the SOAP session ID as the key, in a step S13. Moreover, the Web service 40 included in the composite apparatus 100 makes access to an equipment such as the plotter 1201 or the scanner 1202 or the other hardware resources 1203 of the composite apparatus 100, and causes the accessed equipment to execute a process, based on the session data included in the SOAP request, for example, in a step S14. The Web service 40 included in the composite apparatus 100 creates a SOAP response shown in FIG. 18 which will be described later and including a portion of the session data, as a result of the process executed in the composite apparatus 100, and returns the SOAP response to the Web application 30 included in the PC 10, in a step S15.

When the SOAP response shown in FIG. 18 including the portion of the session data as the result of the process executed in the composite apparatus 100 is received from the Web service 40 included in the composite apparatus 100, the Web application 30 included in the PC 10 creates an HTML response shown in FIG. 19 which will be described later and including the portion of the session data as the result of the process executed in the composite apparatus 100, and sends the HTML response to the Web browser 20 included in the composite apparatus 100, in a step S16. When the HTML response shown in FIG. 19 including the portion of the session data and the HTTP session ID is received from the Web application 30 included in the PC 10, the Web browser 20 included in the composite apparatus 100 analyzes and displays the HTML, in a step S17.

By carrying out the process shown in FIG. 11, it is possible to utilize (or provide) the services provided by the Web service 40 that operates in the composite apparatus 100, via the Web browser 20, using the Web application 30 that is developed and operates in the PC 10, without having to develop and operate the Web application 30 in the composite apparatus 100.

Next, a description will be given of the HTTP request that is sent from the Web browser 20 to the Web application 30 in the step S2 shown in FIG. 11, by referring to FIG. 12. FIG. 12 is a diagram showing the HTTP request.

As shown in FIG. 12, the HTTP request includes "http://pc/application/" as the URL of the HTTP server 31.

Next, a description will be given of the SOAP request that is sent from the Web application 30 to the Web service 40 in the step S4 shown in FIG. 11, by referring to FIG. 13. FIG. 13 is a diagram showing the SOAP request.

As shown in FIG. 13, the SOAP request calls a method "getSoapSessionId" for acquiring the SOAP session ID.

Next, a description will be given of the SOAP response that is sent from the Web service 40 to the Web application 30 in the step S6 shown in FIG. 11, by referring to FIG. 14. FIG. 14 is a diagram showing the SOAP response including the SOAP session ID.

As shown in FIG. 14, the SOAP response includes the SOAP session ID that is stored in a tag "<returnValue></returnValue>".

Next, a description will be given of the HTML response that is sent from the Web application 30 to the Web browser 20 in the step S8 shown in FIG. 11, by referring to FIG. 15. FIG. 15 is a diagram showing the HTML response including the HTTP session ID.

As shown in FIG. 15, the HRMP response includes a value of the HTTP session ID (a value "111" in the case shown in FIG. 15) in a field "hidden".

Next, a description will be given of the HTTP request that is sent from the Web browser 20 to the Web application 30 in the step S10 shown in FIG. 11, by referring to FIG. 16. FIG. 16 is a diagram showing the HTTP request including the HTTP session ID and the input data.

As shown in FIG. 16, the HTTP request includes the HTTP session ID (a value "111" in the case shown in FIG. 16) and the input data ("xxx" in the case shown in FIG. 16).

Next, a description will be given of the SOAP request that is sent from the Web application 30 to the Web service 40 in the step S12 shown in FIG. 11, by referring to FIG. 17. FIG. 17 is a diagram showing the SOAP request including the SOAP session ID and the session data.

As shown in FIG. 17, the SOAP request includes the SOAP session ID (a value "222" in the case shown in FIG. 17) and the session data ("xxx" in the case shown in FIG. 17).

Next, a description will be given of the SOAP response that is sent from the Web service 40 to the Web application 30 in the step S15 shown in FIG. 11, by referring to FIG. 18. FIG. 18 is a diagram showing the SOAP response including a portion of the session data.

As shown in FIG. 18, the SOAP response includes the portion ("yyy" in the case shown in FIG. 18) of the session data, as the result of the executed process.

Next, a description will be given of the HTML response that is sent from the Web application 30 to the Web browser 20 in the step S16 shown in FIG. 11, by referring to FIG. 19. FIG. 19 is a diagram showing the HTML response including the HTTP session ID and a portion of the session data.

As shown in FIG. 19, the HTML response includes the value of the HTTP session ID (a value "111" in the case shown in FIG. 19) in the field "hidden". In addition, the portion ("yyy" in the case shown in FIG. 19) of the session data is included in a tag "<p></p>", as the result of the executed process.

Next, a description will be given of the processes of the Web application 30 to create or acquire the URL of the Web service 40, and to register the Web service URL in the table that is stored and managed by the storage part 34, by referring to second through fifth embodiments of the present invention. In the second embodiment, it is assumed for the sake of convenience that the storage part 34 of the Web application 30 stores and manages the tables shown in FIG. 7. Further, in the third embodiment, it is assumed for the sake of convenience that the storage part 34 of the Web application 30 stores and manages the table shown in FIG. 8.

Second Embodiment

Figure 20:
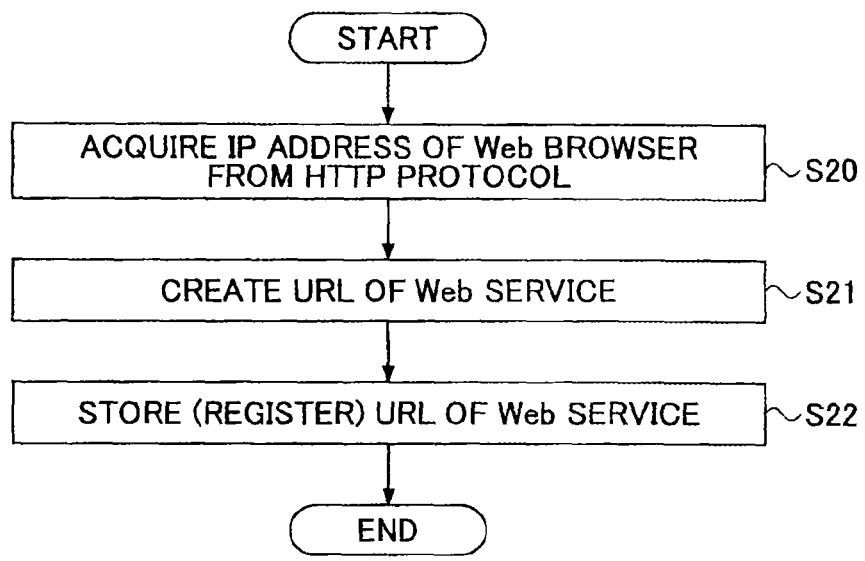
FIG. 20 is a flow chart for explaining a Web service URL registration process.

FIG. 20 is a flow chart for explaining a Web service URL registration process.

When the Web application 30 receives the HTTP request from the Web browser 20 in the step S2 shown in FIG. 11, the Web application 30 acquires the IP address of the Web browser 20 from the HTTP protocol, in a step S20 shown in FIG. 20. Based on the IP address of the Web browser 20 acquired in the step S20, the Web application 30 creates the URL of the Web service 40 that is included in the same apparatus (composite apparatus 100) as the Web browser 20, in a step S21. The Web application 30 stores (registers) in the table shown in FIG. 7 the Web service URL that is created in the step S21, in a step S22.

By carrying out the process shown in FIG. 20, the Web application 30 can send the SOAP request with respect to the created and registered Web service URL in the step S4 shown in FIG. 11.

According to the method employed in the second embodiment, the HTTP session ID and the Web service URL are not managed in correspondence with each other, as may be seen from FIG. 7. For this reason, the same Web application 30 cannot be utilized from a plurality of apparatuses such as the composite apparatus 100.

Third Embodiment

Figure 21:
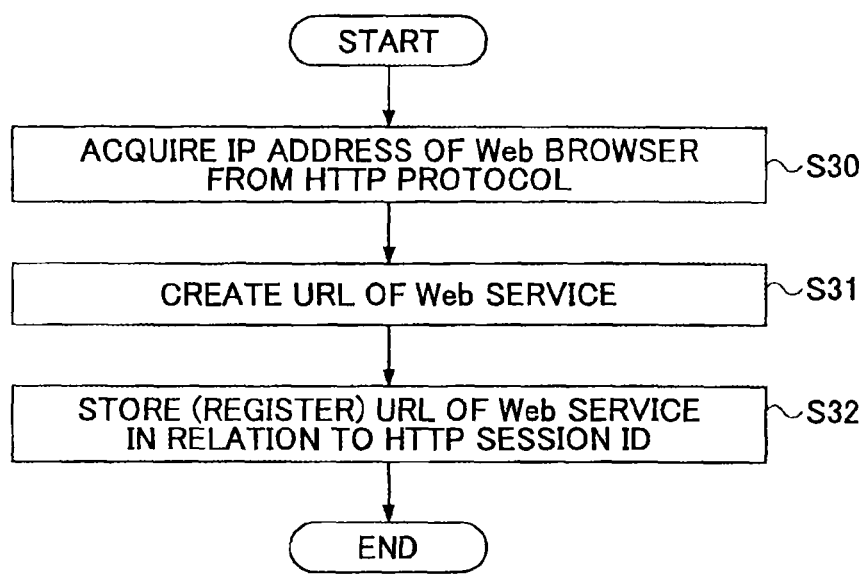
FIG. 21 is a flow chart for explaining another Web service URL registration process.

A description will be given of another process of registering the Web service 40, by referring to FIG. 21. FIG. 21 is a flow chart for explaining this other Web service URL registration process.

When the Web application 30 receives the HTTP request from the Web browser 20 in the step S2 shown in FIG. 11, the Web application 30 acquires the IP address of the Web browser 20 from the HTTP protocol, in a step S30 shown in FIG. 21. Based on the IP address of the Web browser 20 acquired in the step S30, the Web application 30 creates the URL of the Web service 40 that is included in the same apparatus (composite apparatus 100) as the Web browser 20, in a step S31. The Web application 30 stores (registers) in the table shown in FIG. 8 the Web service URL that is created in the step S31, in a step S32.

By carrying out the process shown in FIG. 21, even when requests are received from a plurality of apparatuses (such as the composite apparatus 100), the Web application 30 can create the URL of the Web service 40 included in each of the plurality of apparatuses and send the SOAP request shown in FIG. 13 with respect to each created Web service URL.

Figure 22:
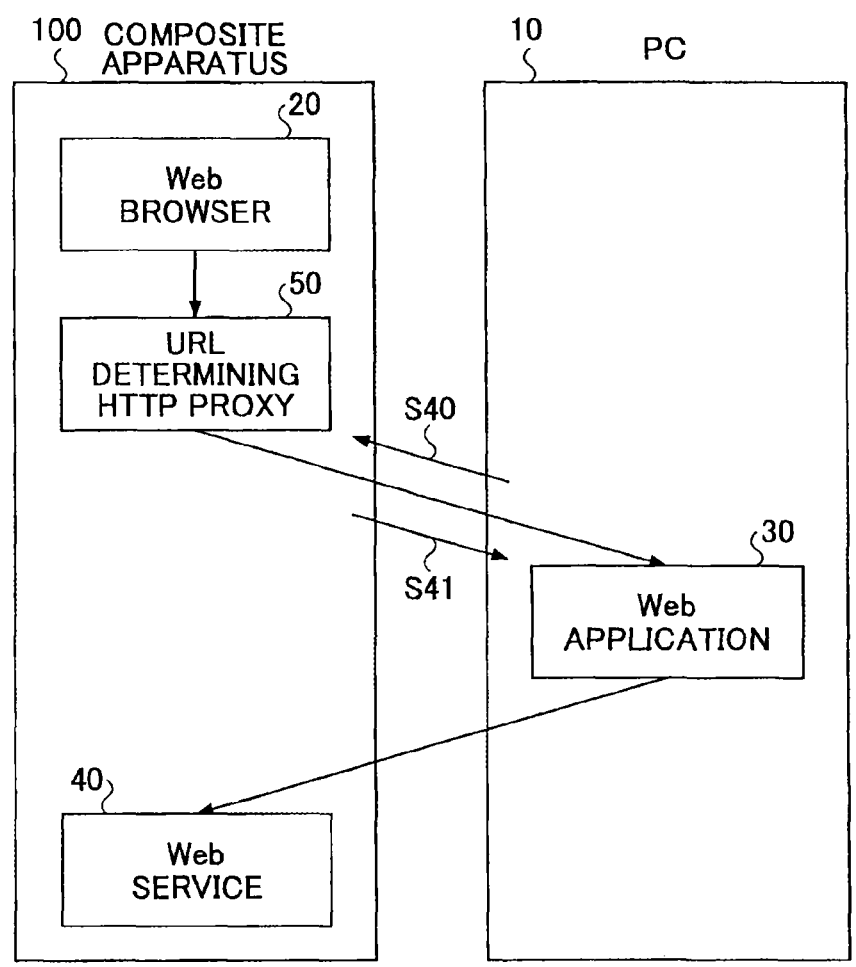
FIG. 22 is a diagram for explaining communications and structures of apparatuses related to the Web service URL registration process.

According to the methods employed in the second and third embodiments, the Web application 30 cannot acquire the IP address of the Web browser 20 if an HTTP proxy enters between the Web browser 20 and the Web application 30. In such a case, the URL of the Web service 40 cannot be created Fourth Embodiment A description will be given of communications and structures of apparatuses related to the Web service URL registration process, by referring to FIG. 22. FIG. 22 is a diagram for explaining the communications and structures of the apparatuses related to the Web service URL registration process.

In this fourth embodiment, the composite apparatus 100 includes in the applications 1230 an URL determining HTTP proxy 50 for determining the URL of the Web service 40.

In this fourth embodiment, the Web browser 20 communicates with the Web application 30 via the URL determining HTTP proxy 50.

Furthermore, in this fourth embodiment, when the Web application 30 included in the PC 10 receives the HTTP request from the Web browser 20 included in the composite apparatus 100 via the URL determining HTTP proxy 50 included in the composite apparatus 100, as indicated by the step S2 shown in FIG. 11, the Web application 30 creates an HTML form shown in FIG. 23 which will be described later and sends the HTML form to the URL determining HTTP proxy 50 included in the composite apparatus 100, in a step S40 shown in FIG. 22.

When the URL determining HTTP proxy 50 included in the composite apparatus 100 receives from the Web application 30 included in the PC 10 the HTML form shown in FIG. 23 requesting input of the Web service URL, the URL determining HTTP proxy 50 analyzes the field corresponding to the input of the Web service URL, creates a result of the form shown in FIG. 24 which will be described later and including the URL of the Web service 40 included in the same composite apparatus 100, and sends the result of the form to the Web application 30 included in the PC 10, in a step S41 shown in FIG. 22.

By carrying out the process shown in FIG. 22, the Web application 30 can acquire the URL of the Web service 40, store (register) the acquired URL in the table shown in FIG. 7 or 8, and send the SOAP request shown in FIG. 13 to the stored Web service URL.

According to the method employed in the fourth embodiment, the Web application 30 can acquire the URL of the Web service 40 and store (register) the acquired URL in the table shown in FIG. 7 or 8, even if an HTTP proxy enters between the Web browser 20 and the Web application 30.

The HTML form that is sent from the Web application 30 to the URL determining HTTP proxy 50 in the step S40 shown in FIG. 22 is shown in FIG. 23. FIG. 23 is a diagram showing the HTML form requesting input of the Web service URL.

The result of the form sent from the URL determining HTTP proxy 50 to the Web application 30 in the step S41 shown in FIG. 22 is shown in FIG. 24. FIG. 24 is a diagram showing the result of the form including the Web service URL.

As shown in FIG. 24, the result of the form includes the URL ("http://mfp/service" in the case shown in FIG. 24) of the Web service 40.

Fifth Embodiment

Figure 25:
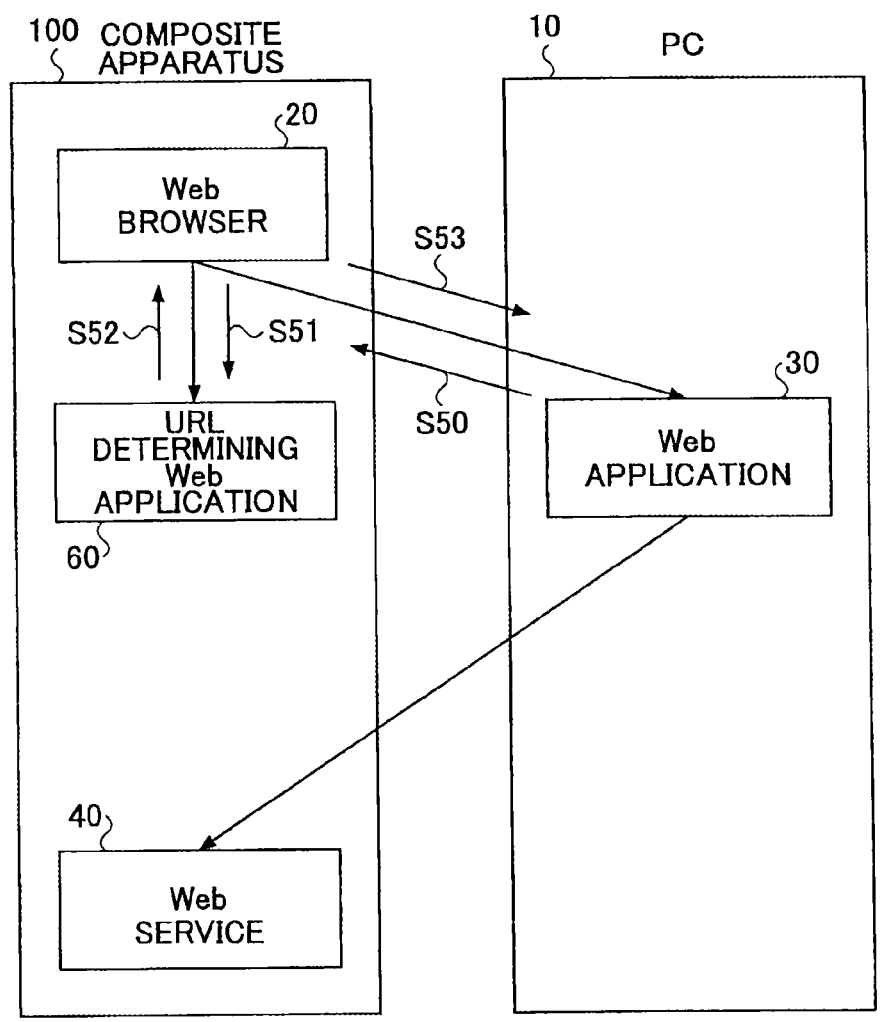
FIG. 25 is a diagram for explaining communications and structures of apparatuses related to the Web service URL registration process.

Next, a description will be given of other communications and structures of the apparatuses related to the Web service URL registration process, by referring to FIG. 25. FIG. 25 is a diagram for explaining the other communications and structures of the apparatuses related to the Web service URL registration process.

In this fifth embodiment, the composite apparatus 100 includes in the applications 1230 an URL determining Web application 60 for determining the URL of the Web service 40.

In this fifth embodiment, when the Web application 30 included in the PC 10 receives the HTTP request from the Web browser 20 included in the composite apparatus 100, as indicated by the step S2 shown in FIG. 11, the Web application 30 creates a redirect request shown in FIG. 26 which will be described later and includes a Web application URL for URL determination (hereinafter referred to as an URL determining Web application URL), and sends the redirect request to the Web browser 20 included in the composite apparatus 100, in a step S50 shown in FIG. 25.

When the Web browser 20 included in the composite apparatus 100 receives from the Web application 30 included in the PC 10 the redirect request shown in FIG. 26 including the URL determining Web application URL, the Web browser 20 creates an HTTP request shown in FIG. 27 which will be described later and includes the URL of the application (the URL determining Web application 60 included in the composite apparatus 100 in the case of the fifth embodiment) that is written in a field "Location" included in the redirect request, and sends the HTTP request with respect to the URL of the application, in a step S51 shown in FIG. 25.

When the URL determining Web application 60 included in the composite apparatus 100 receives from the Web browser 20 included in the composite apparatus 100 the HTTP request shown in FIG. 27 including the URL determining Web application URL, the URL determining Web application 60 creates a redirect request shown in FIG. 28 which will be described later and including the Web service URL, and sends the redirect request to the Web browser 20 included in the composite apparatus 100, in a step S52 shown in FIG. 25.

When the Web browser 20 included in the composite apparatus 100 receives from the URL determining Web application 60 included in the composite apparatus 100 the redirect request shown in FIG. 28 including the Web service URL, the Web browser 20 creates an HTTP request shown in FIG. 29 which will be described later and includes the Web service URL with respect to the URL of the application (the Web application 30 included in the PC 10 in the case of the fifth embodiment) that is written in a field "Location" included in the redirect request, and sends the HTTP request with respect to the URL of the application, in a step S53 shown in FIG. 25.

By carrying out the process shown in FIG. 25, the Web application 30 can acquire the URL of the Web service 40, store (register) the acquired URL in the table shown in FIG. 7 or 8, and send the SOAP request shown in FIG. 13 to the stored Web service URL.

According to the method employed in the fifth embodiment, the Web application 30 can acquire the URL of the Web service 40 and store (register) the acquired URL in the table shown in FIG. 7 or 8, even if an HTTP proxy is inserted between the Web browser 20 and the Web application 30, because the URL determining Web application 60 that communicates with the Web browser 20 is provided.

The redirect request that is sent from the Web application 30 to the Web browser 20 in the step S50 shown in FIG. 25, is shown in FIG. 26. FIG. 26 is a diagram showing the direct request including the URL determining Web application URL.

As shown in FIG. 26, the URL of the URL determining Web application 60 is included in the field "Location" of the redirect request.

The HTTP request that is sent from the Web browser 20 to the URL determining Web application 60 in the step S51 shown in FIG. 25, is shown in FIG. 27. FIG. 27 is a diagram showing the HTTP request including the Web application URL for URL determination.

As shown in FIG. 27, the HTTP request includes the URL of the URL determining Web application 60.

The redirect request that is sent from the URL determining Web application 60 to the Web browser 20 in the step S52 shown in FIG. 25, is shown in FIG. 28. FIG. 28 is a diagram showing the direct request including the Web service URL.

As shown in FIG. 28, the redirect request includes the URL ("http://mfp/service" in the case shown in FIG. 28) of the Web service 40.

The HTTP request tat is set from the Web browser 20 to the Web application 30 in the step S53 shown in FIG. 25, is shown in FIG. 29. FIG. 29 is a diagram showing the HTTP request including the Web service URL.

As shown in FIG. 29, the HTTP request includes the URL ("http://mfp/service" in the case shown in FIG. 29) of the Web service 40.

Sixth Embodiment

Figure 30:
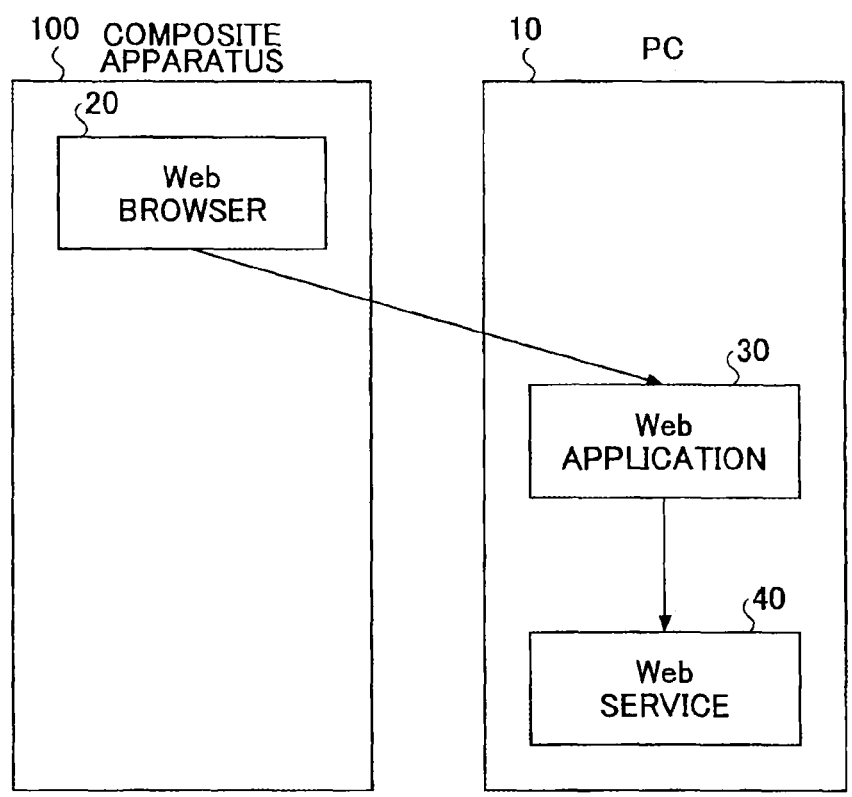
FIG. 30 is a system block diagram for explaining another structure of the present invention.

Next, a description will be given of another structure of the present invention, by referring to FIG. 30. FIG. 30 is a system block diagram for explaining the other structure of the present invention.

In the embodiments described above, the Web service 40 is included in the composite apparatus 100 as shown in FIG. 1. But in a sixth embodiment of the present invention, the Web service 40 is included in the PC 10. Hence, the user can use the Web browser 20 to utilize the Web service 40 via the Web application 30.

Seventh Embodiment

Figure 31:
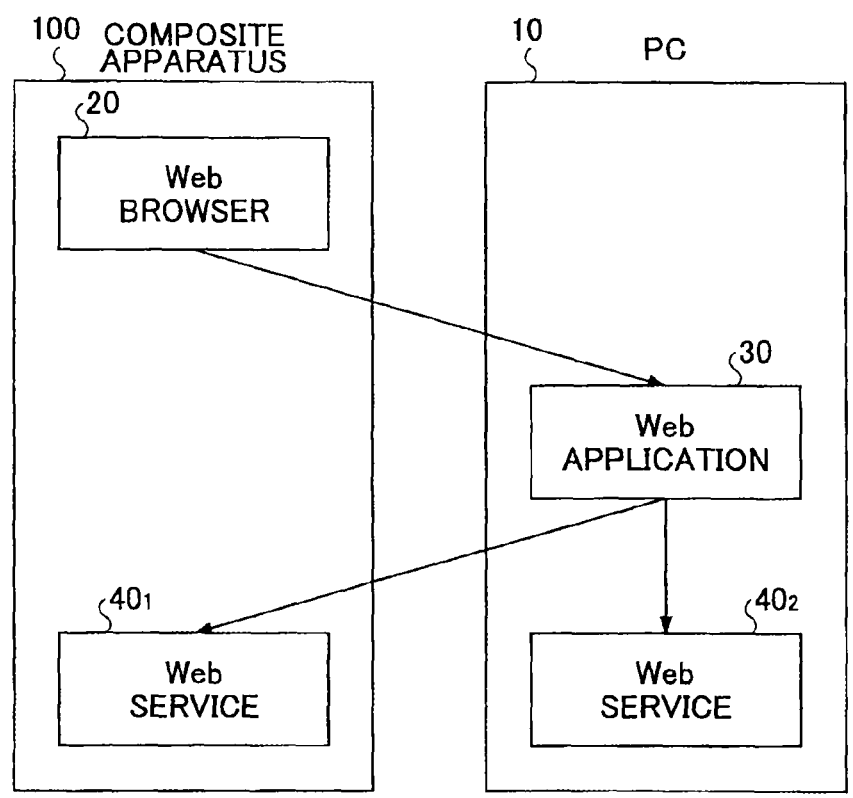
FIG. 31 is a system block diagram for explaining another structure of the present invention.

Next, a description will be given of still another structure of the present invention, by referring to FIG. 31. FIG. 31 is a system block diagram for explaining the other structure of the present invention.

According to the structure shown in FIG. 31, the user can use the Web browser 20 to switch and utilize a Web service $40_1$ included in the composite apparatus 100 or a Web service $40_2$ included in the PC 10, via the Web application 30.

In addition, instead of switching between the Web services $40_1$ and $40_2$ to be utilized, the user may use the Web browser 20 and utilize a combination of the Web service $40_1$ included in the composite apparatus 100 and the Web service $40_2$ included in the PC 10, via the Web application 30. For example, the Web service 401 may be related to the scanning of the document or the like, and the Web service $40_2$ may be related to the management of the document or the like.

Eighth Embodiment

Figure 32:
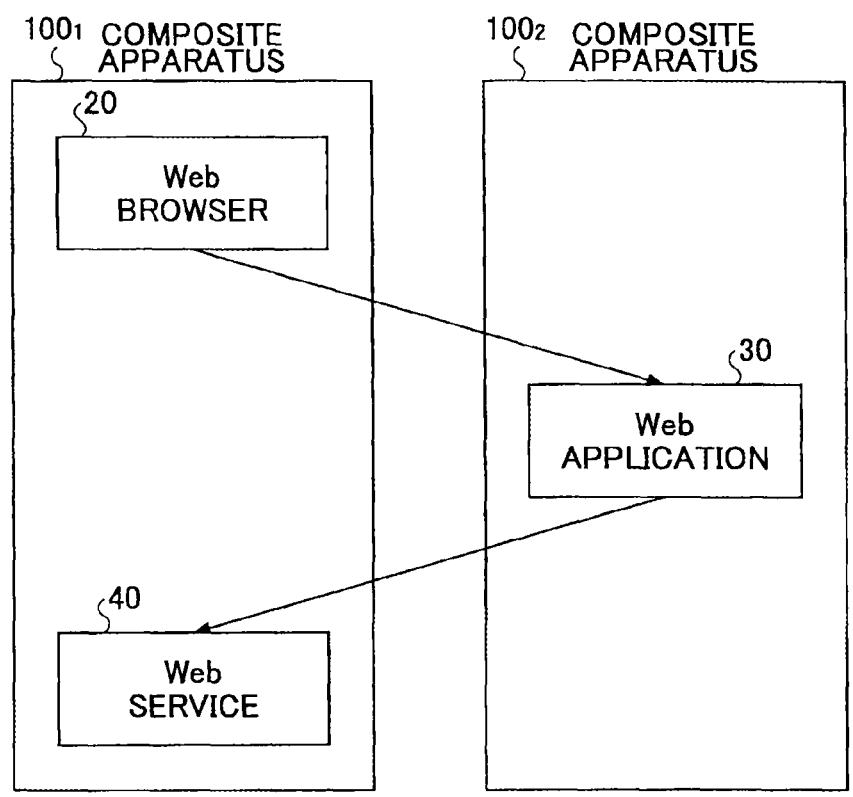
FIG. 32 is a system block diagram for explaining another structure of the present invention.

Next, a description will be given of still another structure of the present invention, by referring to FIG. 32. FIG. 32 is a system block diagram for explaining the other structure of the present invention.

As may be seen from FIG. 32, the Web application 30 may be installed in an apparatus other than the PC 10, such as a composite apparatus $100_2$ that is other than a composite apparatus $100_1$ installed with the Web browser 20 and the Web service 40. If the composite apparatus $100_2$ installed with the Web application 30 exists, the composite apparatus $100_1$ which includes the Web browser 20 and the Web service 40 does not need to be installed with the Web application 30, and the functions thereof can easily be expanded by utilizing the Web application 30 that is installed in the composite apparatus $100_2$.

Ninth Embodiment

Figure 33:
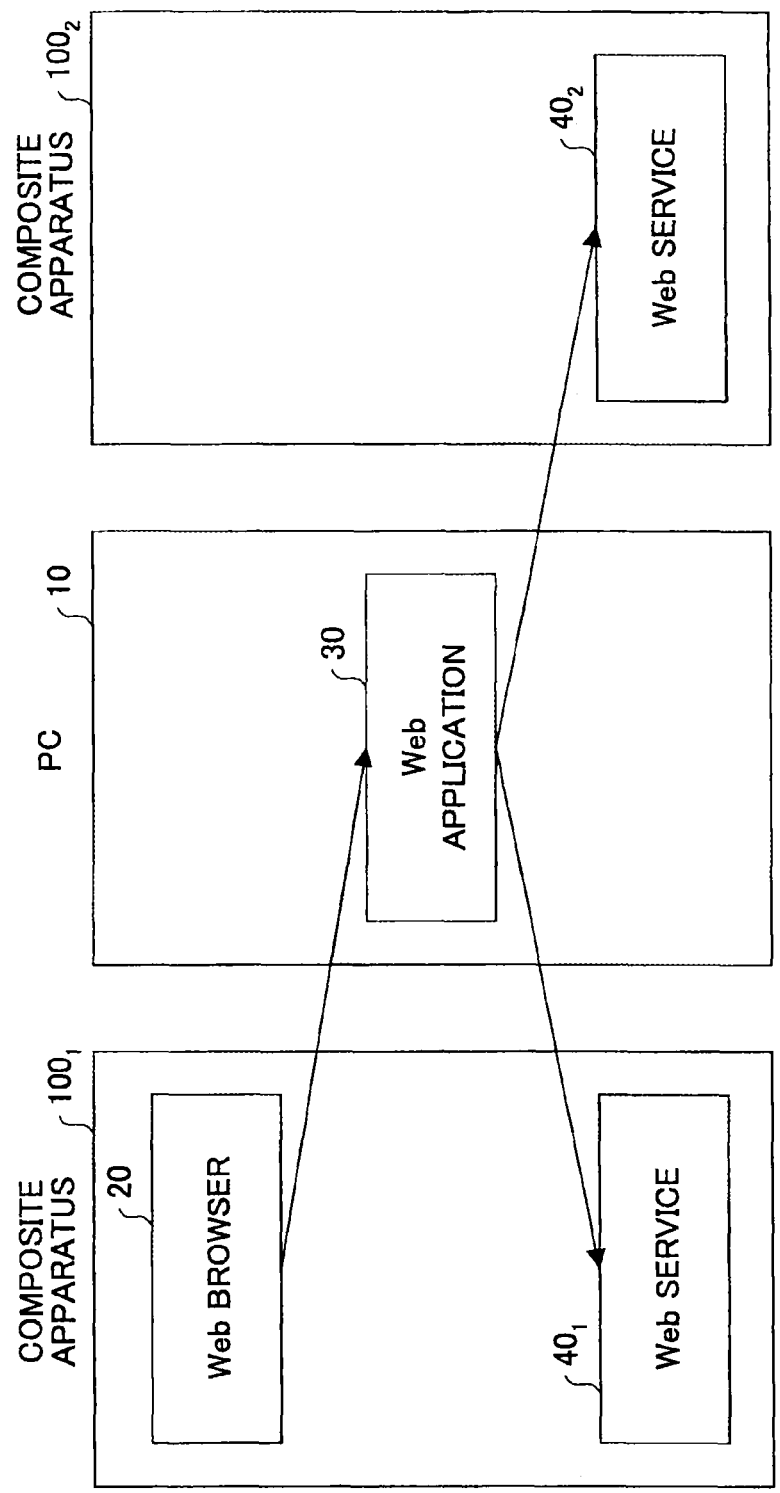
FIG. 33 is a system block diagram for explaining another structure of the present invention.

Next, a description will be given of still another structure of the present invention, by referring to FIG. 33. FIG. 33 is a system block diagram for explaining the other structure of the present invention.

According to the structure shown in FIG. 33, the user can use the Web browser 20 to switch and utilize a Web service $40_1$ included in a composite apparatus $100_1$ or a Web service $40_2$ included in a composite apparatus $100_2$, via the Web application 30.

In addition, instead of switching between the Web services $40_1$ and $40_2$ to be utilized, the user may use the Web browser 20 and utilize a combination of the Web service $40_1$ included in the composite apparatus $100_1$ and the Web service $40_2$ included in the composite apparatus $100_2$, via the Web application 30. For example, the Web service $40_1$ may be related to the scanning of the document or the like, and the Web service $40_2$ may be related to the printing of the document or the like. In other words, the user can use the Web browser 20 to scan the document in the composite apparatus $100_1$ via the Web application 30 included in the PC 10, and print the scanned document in the composite apparatus $100_2$ by sending the scanned document data to the composite apparatus $100_2$ directly or via the Web application 30 included in the PC 10.

Tenth Embodiment

Figure 34:
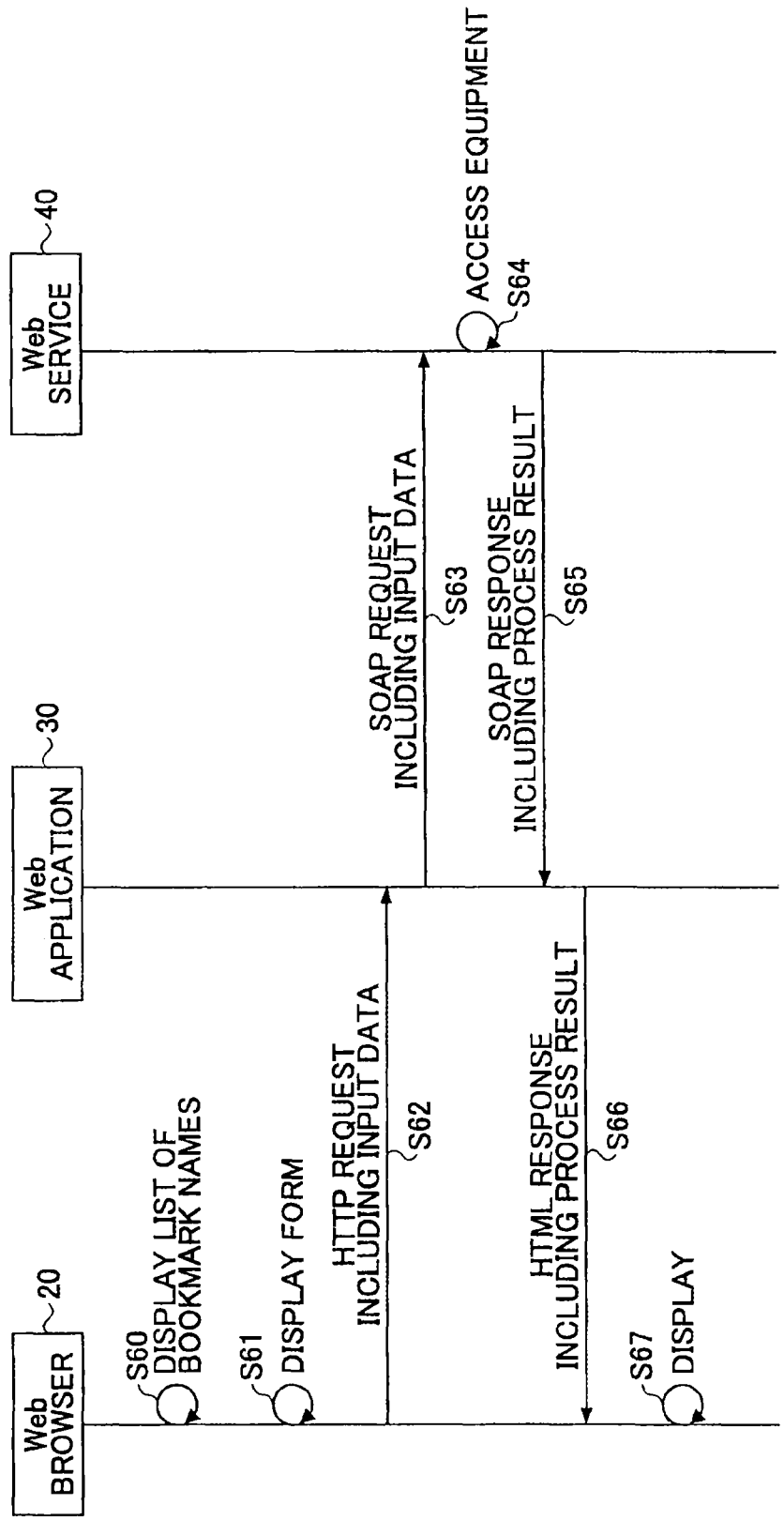
FIG. 34 is a sequence diagram for generally explaining a service providing process.

Next, a general description will be given of another process which utilizes the services provided by the Web service 40 included in the composite apparatus 100 itself, via the Web browser 20 of the composite apparatus 100, using the Web application 30 included in the PC 10, by referring to FIG. 34. FIG. 34 is a sequence diagram for generally explaining the other service providing process.

First, the Web browser 20 included in the composite apparatus 100 displays a list of bookmark names depending on a request or the like from the user, in a step S60 shown in FIG. 34. When the user selects a bookmark, the Web browser 20 included in the composite apparatus 100 creates and displays a form including the URL of the selected bookmark, in a step S61 shown in FIG. 34.

When the user makes an input operation on the form, the Web browser 20 included in the composite apparatus 100 creates an HTTP request including the input data, and sends the HTTP request with respect to the specified URL within the form, in a step S62 shown in FIG. 34.

When HTTP request is received from the Web browser 20 included in the composite apparatus 100, the Web application 30 included in the PC 10 acquires the Web service URL from the table that includes the Web service URL as an item as shown in FIG. 7, for example, so as to create a SOAP request including the input data included in the HTTP request, and to send the SOAP request with respect to the Web service URL, in a step S63 shown in FIG. 34.

For the sake of convenience, it is assumed in this embodiment that the Web service URL is stored in the table which includes the Web service URL as an item as shown in FIG. 7, when employing the method of the second, third or fourth embodiment described above.

When the SOAP request including the input data is received from the Web application 30 included in the PC 10, the Web service 40 included in the composite apparatus 100 makes access to an equipment such as the plotter 1201 or the scanner 1202 or the other hardware resources 1203 of the composite apparatus 100, and causes the accessed equipment to execute a process, based on the input data included in the SOAP request, for example, in a step S64 shown in FIG. 34. For example, the Web service 40 causes the accessed equipment to carry out an image forming process.

The Web service 40 included in the composite apparatus 100 creates a SOAP response including a result of executing the process (for example, the image forming process) in the composite apparatus 100, and returns the SOAP response to the Web application 30 included in the PC 10, in a step S65 shown in FIG. 34.

When the SOAP response including the result of executing the process in the composite apparatus 100 is received from the Web server 40 included in the composite apparatus 100, the Web application 30 included in the PC 10 creates an HTML response including the result of the executed process, and returns the HTML response to the Web browser 20 included in the composite apparatus 100, in a step S66 shown in FIG. 34.

When the HTML response including the result of the executed process is received from the Web application 30 included in the PC 10, the Web browser 20 included in the composite apparatus 100 analyzes and displays the HTML in a step S67 shown in FIG. 34.

By carrying out the process shown in FIG. 34, it is possible to utilize (or provide) the services provided by the Web service 40 that operates in the composite apparatus 100, via the Web browser 20, using the Web application 30 that is developed and operates in the PC 10, without having to develop and operate the Web application 30 in the composite apparatus 100 and without making the sessions of the embodiments described above.

Eleventh Embodiment

Next, a description will be given of structures and processes employed by an eleventh embodiment of the present invention, for a case where a client application 70 is downloaded (or installed) in the Web browser 20. The client application 70 may be a Java (registered trademark) applet or, a Flash (registered trademark) application or the like.

Figure 35:
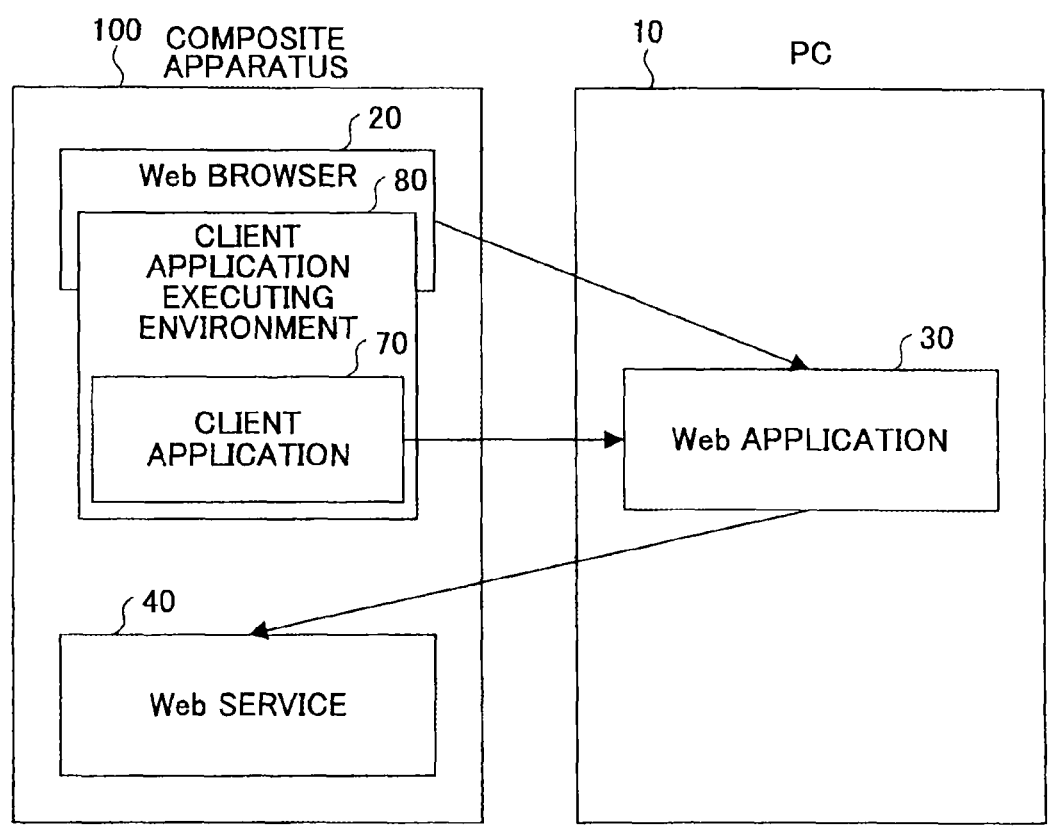
FIG. 35 is a system block diagram for explaining another structure of the present invention.

FIG. 35 is a system block diagram for explaining another structure of the present invention. As shown in FIG. 35, the user of the composite apparatus 100 can use the Web service 40 included in the composite apparatus 100 by utilizing the Web application 30 included in the PC 10, via the Web browser 20 to which the client application 70 such as the Java applet or Flash application is downloaded.

By downloading the client application 70 into the Web browser 20, it is possible to realize a dynamic Web page such as a combination of audio and animation, that are otherwise impossible to realize on a static Web page described in HTML.

For the sake of convenience, it is assumed in this embodiment that a client application execution environment 80, such as a Java Virtual Machine or a Flash Player, is already downloaded into the Web browser 20.

Next, a description will be given of a functional structure of the client application 70, by referring to FIG. 36. FIG. 36 is a diagram for explaining the functional structure of the client application 70. As shown in FIG. 36, the client application 70 includes a main application body 71, a SOAP client 72 and a storage part 73.

The main application body 71 forms a main body portion of the functions provided by the client application 70, and communicates with the SOAP client 72. The main application body 72 is called from the Web browser 20, for example, and provides to the Web browser 20 the functions provided by the client application 70.

The SOAP client 72 communicates with the main application body 71, and also communicates with the Web application 30 (or the SOAP server 35 of the Web application 30) via the Internet or the like, for example. The storage part 73 is used by the main application body 71 or the SOAP client 72 when necessary. For example, the storage part 73 stores the data input by the user, the data included in the response received from the Web application 30, and the like.

Next, a description will be given of another functional structure of the Web application 30, by referring to FIG. 37. FIG. 37 is a diagram for explaining the other functional structure of the Web application 30. As shown in FIG. 37, the Web application 30 includes an HTTP server 31, a main application body 23, a SOAP client 33, a storage part 34, a SOAP server 35, and a client application download part 36.

The HTTP server 31 communicates with the Web browser 20 via the Internet or the like, and also communicates with the main application body 32 and the client application download part 36. The main application body 32 forms a main body portion of the functions provided by the Web application 30, and communicates with the HTTP server 31, the SOAP client 33 and the SOAP server 35.

The SOAP client 33 communicates with the main application body 32, and also communicates with the Web service 40 (or the SOAP server 41 of the Web service 40) via the Internet or the like. The storage part 34 is used by the HTTP server 31 or the main application body 32 or the SOAP client 33 or the SOAP server 35 or the client application download part 36 when necessary. For example, the storage part 34 stores and manages the table that includes the Web service URL as an item.

The SOAP server 35 communicates with the main application body 32, and also communicates with the client application 70 (or the SOAP client 72 of the client application 70) via the Internet or the like. The client application download part 36 puts the client application 70 into a state downloadable to the Web browser 20, when the HTTP request from the Web browser 20 included in the composite apparatus 100 is received via the HTTP server 31 or the like. For example, the client application 70 is stored in the HDD 19 of the PC 10.

Figure 38:
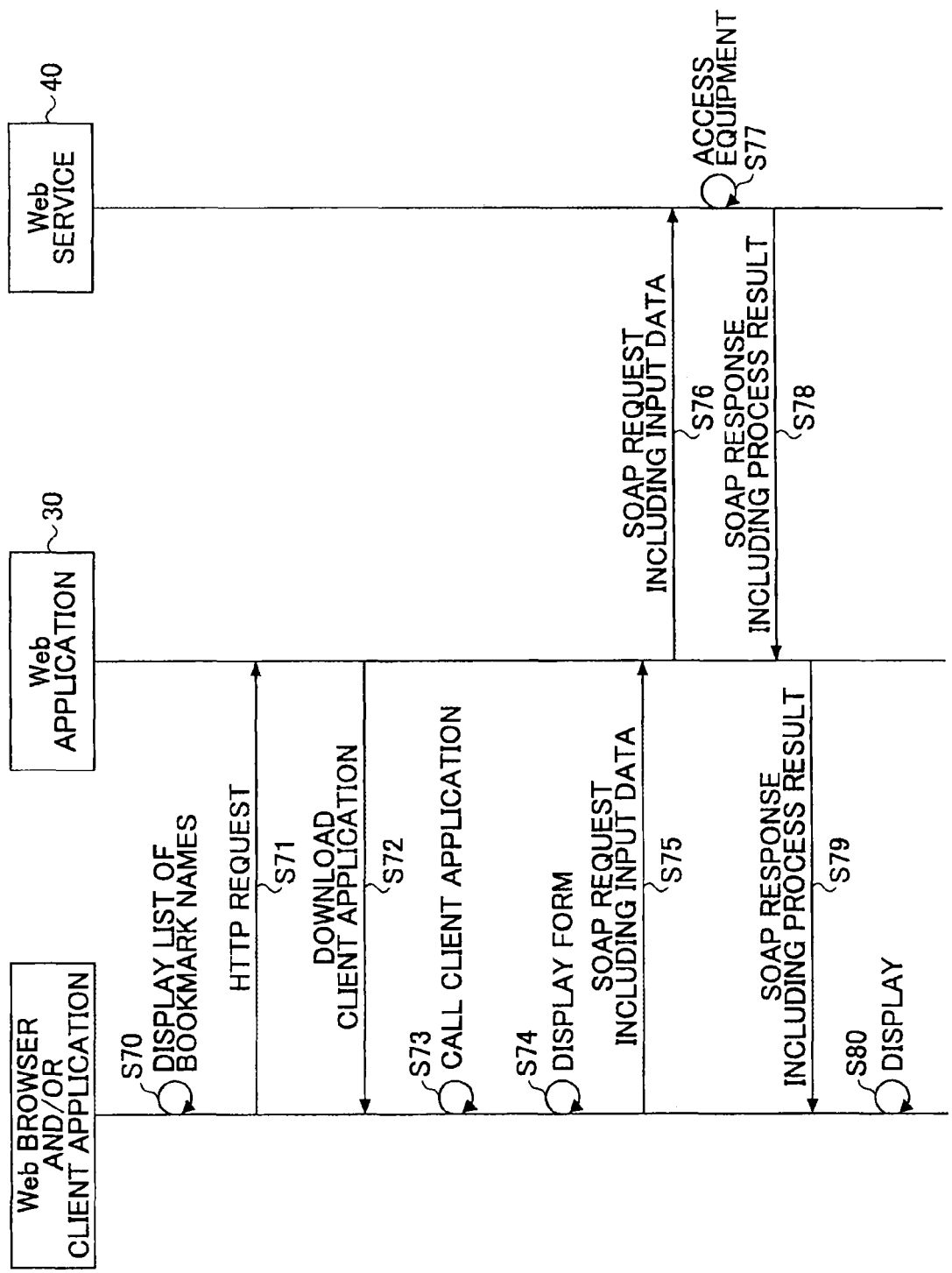
FIG. 38 is a sequence diagram for generally explaining a service providing process.

Next, a general description will be given of still another process which utilizes the services provided by the Web service 40 included in the composite apparatus 100 itself, via the client application 70 and/or the Web browser 20 of the composite apparatus 100, using the Web application 30 included in the PC 10, by referring to FIG. 38. FIG. 38 is a sequence diagram for generally explaining the other service providing process.

First, the Web browser 20 included in the composite apparatus 100 displays a list of bookmark names depending on a request or the like from the user, in a step S70 shown in FIG. 38. When the user selects a bookmark, the Web browser 20 included in the composite apparatus 100 creates and sends an HTTP request with respect to the URL of the selected bookmark, in a step S71 shown in FIG. 38.

After the HTTP request is sent to the URL of the bookmark selected by the user, the Web browser 20 included in the composite apparatus 100 downloads the client application 70 from the Web application 30 at the URL, in a step 72 shown in FIG. 38.

The Web browser 20 included in the composite apparatus 100 may decide whether or not the client application 70 is already downloaded from the Web application 30 included in the PC 10, prior to carrying out the process of the step S72. In this case, the process of the step S72 may be omitted and the process may advance to a step S73 shown in FIG. 38 if the decision result is YES. In this case, if the decision result is NO, the process of the step S72 is carried out as described above. The Web browser 20 included in the composite apparatus 100 can decide whether or not the client application 70 is already downloaded from the Web application 30 included in the PC 10, based on a flag which is related to the downloading and the like of the client application 70 and is set in the HDD 1303 of the composite apparatus 100, for example.

When the client application 70 is downloaded, the Web browser 20 included in the composite apparatus 100 calls the downloaded client application 70, in the step S73 shown in FIG. 38.

The Web browser 20 including the called client application 70 and included in the composite apparatus 100 creates and displays a form including the URL of the bookmark selected by the user in the step S70, in a step S74 shown in FIG. 38.

When the user makes an input operation on the form, the client application 70 included in the composite apparatus 100 creates a SOAP request shown in FIG. 42 which will be described later and including the input data and the Web service URL that is acquired by the method which will be described later in conjunction with FIG. 39, and sends the SOAP request to the specified URL within the form, in a step S75 shown in FIG. 38.

When the SOAP request including the input data and the Web service URL is received from the client application 70 included in the composite apparatus 100, the Web application 30 included in the PC 10 creates a SOAP request including the input data included in the received SOAP request, and sends the created SOAP request with respect to the Web service URL that is included in the SOAP request received from the client application 70, in a step S76 shown in FIG. 38.

When the SOAP request including the input data is received from the Web application 30 included in the PC 10, the Web service 40 included in the composite apparatus 100 makes access to an equipment such as the plotter 1201 or the scanner 1202 or the other hardware resources 1203 of the composite apparatus 100, and causes the accessed equipment to execute a process, based on the input data included in the received SOAP request, in a step S77 shown in FIG. 38. For example, an image forming process is executed by the equipment.

The Web service 40 included in the composite apparatus 100 creates a SOAP response including a result of the execution of the process (for example, the image forming process) executed in the composite apparatus 100, and returns the SOAP response to the Web application 30 included in the PC 10, in a step S78 shown in FIG. 38.

When the SOAP response including the result of the process executed in the composite apparatus 100 is received from the Web service 40 included in the composite apparatus 100, the Web application 30 included in the PC 10 creates a SOAP response including the result of the executed process, and sends the created SOAP response to the client application 70 included in the composite apparatus 100, in a step S79 shown in FIG. 38.

When the SOAP response including the result of the executed process is received from the Web application 30 included in the PC 10, the client application 70 included in the composite apparatus 100 creates and displays a screen related to the result of the executed process, in a step S80 shown in FIG. 38.

By carrying out the process shown in FIG. 38, it is possible to utilize (or provide) the services provided by the Web service 40 that operates in the composite apparatus 100, via client application 70 and/or the Web browser 20, using the Web application 30 that is developed and operates in the PC 10, without having to develop and operate the Web application 30 in the composite apparatus 100.

Next, a description will be given of communications and structures of apparatuses related to a Web service URL registration (or notification) process, by referring to FIG. 39. FIG. 39 is a system block diagram for explaining the communications and structures of the apparatuses related to the Web service URL registration (or notification) process.

It is also assumed in this case that the applications 1230 include the URL determining Web application 60 of the Web service 40, similarly as in the case of the above described embodiments.

When the client application 70 included in the composite apparatus 100 is called by the Web browser 20 included in the composite apparatus 100 in the step S73 shown in FIG. 38, for example, the client application 70 creates a SOAP request shown in FIG. 40 which will be described later, and sends the created SOAP request with respect to the URL determining Web application 60 included in the composite apparatus 100, in a step S80 shown in FIG. 39.

When the SOAP request shown in FIG. 40 is received from the client application 70 included in the composite apparatus 100, the URL determining Web application 60 included in the composite apparatus creates a SOAP response shown in FIG. 41 which will be described later and including the Web service URL, and sends the created SOAP response to the client application 70 included in the composite apparatus 100, in a step S81 shown in FIG. 39.

When the SOAP response shown in FIG. 41 including the Web service URL is received from the URL determining Web application 60 included in the composite apparatus 100, the client application 70 included in the composite apparatus 100 creates a SOAP request shown in FIG. 42 which will be described later and including the input data input by the user on the form, and sends the created SOAP request with respect to the Web application 30 included in the PC 10, in a step S82 shown in FIG. 39.

Figure 39:
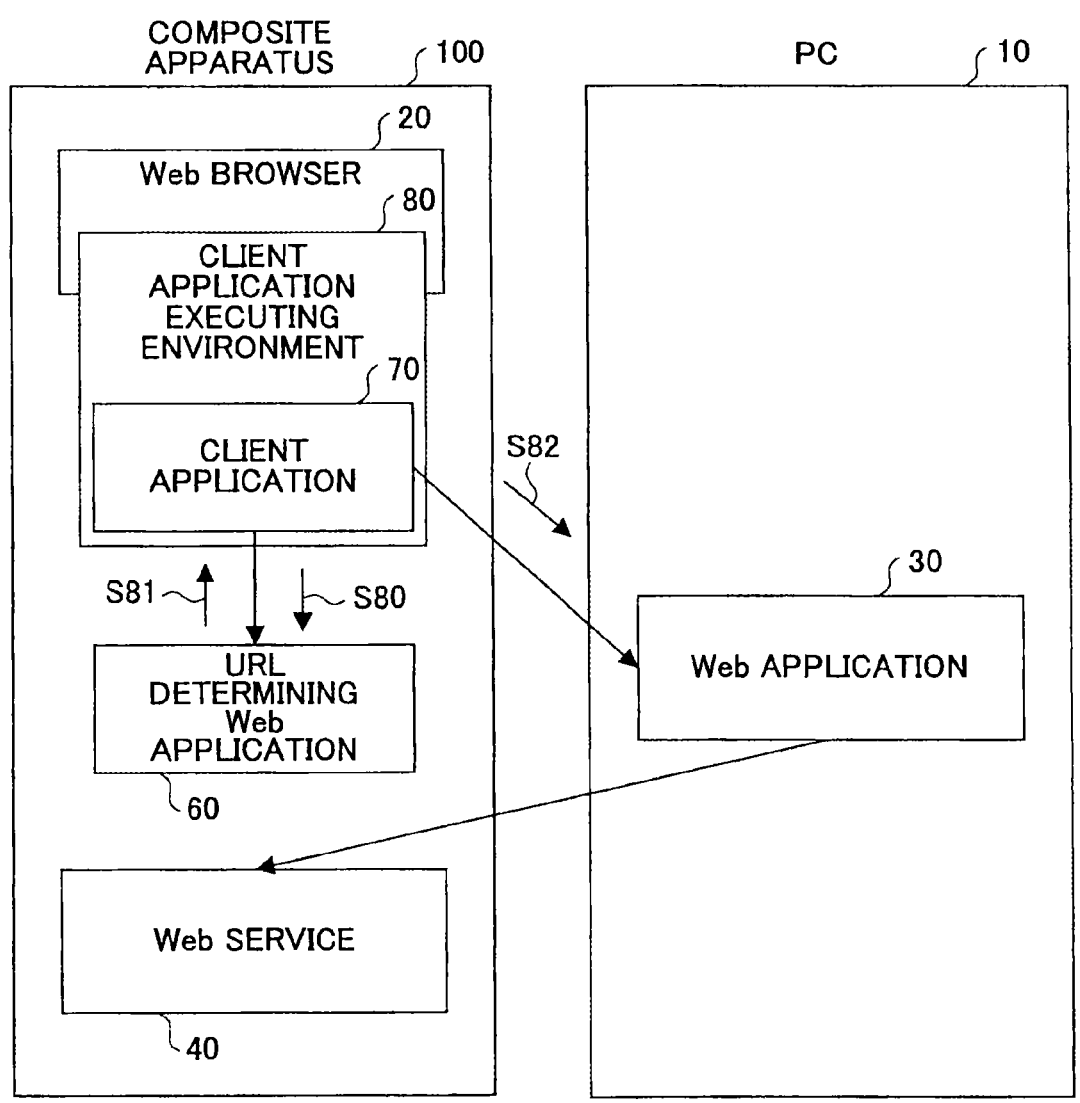
FIG. 39 is a system block diagram for explaining communications and structures of apparatuses related to a Web service URL registration process.

By carrying out the process shown in FIG. 39, the client application 70 can notify the Web service URL to the Web application 30, and the Web application 30 can send the SOAP request and the like with respect to the Web service URL.

Of course, the client application 70 may determine the Web service URL, without using the URL determining Web application 60. In this case where the client application 70 determines the Web service URL, only the process of the step S82 shown in FIG. 39 is carried out. But when the Web service URL is determined by use of the URL determining Web application 60 as shown in FIG. 39, it is possible to efficiently cope with modifications or the like of the installed locations of the Web service 40.

The SOAP request sent from the client application 70 to the URL determining Web application 60 in the step S80 shown in FIG. 39, is shown in FIG. 40. FIG. 40 is a diagram showing the SOAP request related to the URL inquiry of the Web service.

As shown in FIG. 40, the SOAP request calls a method "getServiceUrl" that acquires the URL of the Web service.

The SOAP response sent from the URL determining Web application 60 to the client application 70 in the step S81 shown in FIG. 39, is shown in FIG. 41. FIG. 41 is a diagram showing the SOAP response related to the URL inquiry of the Web service.

As shown in FIG. 41, the SOAP response includes the URL ("http://mfp/service" in the case shown in FIG. 41) of the Web service stored in a tag "<returnValue></returnValue>".

The SOAP request sent from the client application 70 to the Web application 30 in the step S82 shown in FIG. 39, is shown in FIG. 42. FIG. 42 is a diagram showing the SOAP response related to the URL notification of the Web service.

As shown in FIG. 42, the SOAP request includes the URL ("http://mfp/service" in the case shown in FIG. 42) of the Web service stored in a tag "<serviceUrl></serviceUrl>". In addition, the input data ("xxx" in the case shown in FIG. 42) are stored in a tag "<input></input>".

Therefore, according to the present invention, it is possible to expand (or extend) the functions of the service provider apparatus (for example, the composite apparatus 100) without modifying the settings of the service provider apparatus. In addition, it is possible to employ an arbitrary developing method that does not depend on the developing environment peculiar to the service provider apparatus. Moreover, even if a security hole exists in the application included in another apparatus (for example, the PC 10) that is developed or modified, it is possible to improve the security because the virus or the like is prevented from entering the service provider apparatus itself.

In the described embodiments, the Web application 30 creates the URL of the Web service 40 or, the URL determining HTTP proxy 50 or the URL determining Web application 60 is provided in the composite apparatus 100, so as to notify the URL of the Web service 40 to the Web application 30. However, based on the form, it is possible to display a Web page for inputting URL of the Web service 40 in the Web browser 20, and to send the URL of the Web service 40 input by the user to the Web application 30.

Moreover, the various requests and responses used in the present invention are not limited to those shown in the drawings.

Further, the present invention is not limited to these embodiments, but various variations and modifications may be made without departing from the scope of the present invention.

What is claimed is:

1. A processing system, comprising:
   an image forming apparatus including a display, a scanner to scan a document, and first processing circuitry; and
   an information processing apparatus including second processing circuitry, and communicable with the image forming apparatus via a network,
   wherein the first processing circuitry included in the image forming apparatus is configured to
      receive, at the image forming apparatus, from an operator via the display, an input operation for scanning on the image forming apparatus,
      send, from the image forming apparatus, via the network, scanning information to the information processing apparatus based on the input operation received from the operator via the display,
      receive, at the image forming apparatus, an instruction to conduct a scan process to scan the document on the image forming apparatus, the received instruction being sent from the information processing apparatus based on the scanning information sent from the image forming apparatus,
      control, at the image forming apparatus, the scanner to scan the document based on the received instruction,
      generate, at the image forming apparatus, scanned document data based on the document which is scanned by the scanner, and
      send, from the image forming apparatus, via the network, the generated scanned document data to the information processing apparatus, and
   wherein the second processing circuitry included in the information processing apparatus is configured to
      receive, at the information processing apparatus, via the network, the scanning information sent from the image forming apparatus,
      send, from the information processing apparatus, the instruction to the image forming apparatus to conduct the scan process, and
      receive, at the information processing apparatus, via the network, the generated scanned document data from the image forming apparatus.

2. The processing system as claimed in claim 1, wherein the display of the image forming apparatus is configured to
   display a web browser, and
   receive, from the operator, an input operation on the web browser displayed on the display,
   wherein the web browser is configured to send, via the network, the scanning information to the information processing apparatus based on the received input operation.

3. The processing system as claimed in claim 1, wherein the image forming apparatus further includes a web server configured to receive the instruction to conduct the scan process from the information processing apparatus.

4. The processing system as claimed in claim 2, wherein the web browser of the image forming apparatus is further configured to
   send a request to the information processing apparatus,
   receive display data from the information processing apparatus in response to the request, and
   display the received display data.

5. The processing system as claimed in claim 4, wherein the request is a Hypertext Transfer Protocol (HTTP) request, and the display data is HyperText Markup Language (HTML) data.

6. The processing system as claimed in claim 1, wherein
   the scanning information is sent from the image forming apparatus operating as a client to the information processing apparatus operating as a server, and
   the instruction for conducting the scan process is sent from the information processing apparatus operating as a client to the image forming apparatus operating as a server.

7. An image forming apparatus communicable with an information processing apparatus via a network, the image forming apparatus comprising:

a display;
a scanner to scan a document; and
processing circuitry configured to
  receive, from an operator via the display, an input operation for scanning on the image forming apparatus,
  send, via the network, scanning information to the information processing apparatus based on the input operation received from the operator via the display,
  receive an instruction to conduct a scan process to scan the document on the image forming apparatus, from the information processing apparatus in response to the sent scanning information,
  control the scanner to scan the document based on the received instruction,
  generate scanned document data based on the document which is scanned by the scanner, and
  send, via the network, the generated scanned document data to the information processing apparatus,
wherein the scanning information is sent from the image forming apparatus operating as a client to the information processing apparatus operating as a server, and
wherein the instruction to conduct the scan process is received by the image forming apparatus operating as a server from the information processing apparatus operating as a client.

8. The image forming apparatus as claimed in claim 7, wherein the display is configured to
  display a web browser, and
  receive an input operation on the web browser displayed on the display, and
wherein the web browser is configured to send, via the network, the scanning information to the information processing apparatus based on the received input operation.

9. The image forming apparatus as claimed in claim 7, further comprising:
  a web server configured to receive the instruction to conduct the scan process from the information processing apparatus.

10. The image forming apparatus as claimed in claim 8, wherein the web browser is further configured to
  send a request to the information processing apparatus,
  receive display data from the information processing apparatus in response to the request, and
  display the received display data.

11. The image forming apparatus as claimed in claim 10, wherein the request is a Hypertext Transfer Protocol (HTTP) request, and the display data is HyperText Markup Language (HTML) data.

12. A method for an image forming apparatus that includes a display and a scanner to scan a document, the method comprising:
  receiving, at the image forming apparatus, from an operator via the display, an input operation for scanning on the image forming apparatus;
  sending, from the image forming apparatus, via a network, scanning information to an information processing apparatus based on the input operation received from the operator via the display;
  receiving, at the image forming apparatus, an instruction to conduct a scan process to scan the document on the image forming apparatus, from the information processing apparatus in response to the sent scanning information;
  controlling, at the image forming apparatus, the scanner to scan the document based on the received instruction;
  generating, at the image forming apparatus, scanned document data based on the document which is scanned by the scanner; and
  sending, from the image forming apparatus, via the network, the generated scanned document data to the information processing apparatus,
wherein the scanning information is sent from the image fouling apparatus operating as a client to the information processing apparatus operating as a server, and
wherein the instruction to conduct the scan process is received by the image forming apparatus operating as a server from the information processing apparatus operating as a client.

13. The method as claimed in claim 12, further comprising:
  sending a communication request to the information processing apparatus;
  receiving display data from the information processing apparatus; and
  displaying the received display data.

14. The method as claimed in claim 13, wherein the communication request is a Hypertext Transfer Protocol (HTTP) request, and the display data is HyperText Markup Language (HTML) data.

15. The processing system as claimed in claim 1, wherein:
  the image forming apparatus further includes a memory that stores at least a web browser program, and
  the first processing circuitry is further configured to display a web page by executing the web browser program, and
  the first processing circuitry receives, by executing the web browser program, the input operation via the web page from the operator, and
  the first processing circuitry sends, by executing the web browser program, the scanning information to the information processing apparatus based on the received input operation via the web page.

16. The processing system as claimed in claim 15, wherein the first processing circuitry is further configured to:
  send, by executing the web browser program, a request to the information processing apparatus via the network,
  receive, by executing the web browser program, display data from the information processing apparatus via the network as a response to the request, and
  display, by executing the web browser program, the web page on the display based on the received display data.

17. The image forming apparatus as claimed in claim 8, further comprising:
  a memory that stores at least a web browser program; and
  first processing circuitry,
  wherein:
    the first processing circuitry is further configured to display a web page by executing the web browser program, and
    the first processing circuitry receives, by executing the web browser program, the input operation via the web page from the operator, and
    the first processing circuitry sends, by executing the web browser program, the scanning information to the information processing apparatus based on the received input operation via the web page.

18. The image forming apparatus as claimed in claim 17, wherein the first processing circuitry is further configured to:
  send, by executing the web browser program, a request,
  receive, by executing the web browser program, display data as a response to the request, and display, by executing the web browser program, the web page on the display based on the received display data.

19. The processing system as claimed in claim 1, wherein the image forming apparatus further includes a printer engine to print.

20. The processing system as claimed in claim 1, wherein the scanning information that is received at the information processing apparatus and the generated scanned document data received at the information processing apparatus are received at a same information processing apparatus.

21. The image forming apparatus as claimed in claim 7, wherein the image forming apparatus further includes a printer engine to print.

\* \* \* \* \*